(12) United States Patent
Andgart et al.

(10) Patent No.: US 12,041,625 B2
(45) Date of Patent: Jul. 16, 2024

(54) UPLINK TRANSMISSION PRESENCE DETECTION

(71) Applicant: Telefonaktiebolaget LM Ericsson (publ), Stockholm (SE)

(72) Inventors: Niklas Andgart, Södra Sandby (SE); Majid Gerami, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 490 days.

(21) Appl. No.: 17/421,992

(22) PCT Filed: Dec. 18, 2019

(86) PCT No.: PCT/EP2019/085867
§ 371 (c)(1),
(2) Date: Jul. 9, 2021

(87) PCT Pub. No.: WO2020/144015
PCT Pub. Date: Jul. 16, 2020

(65) Prior Publication Data
US 2022/0124787 A1    Apr. 21, 2022

Related U.S. Application Data

(60) Provisional application No. 62/791,702, filed on Jan. 11, 2019.

(51) Int. Cl.
*H04W 72/23*   (2023.01)
*H04W 72/21*   (2023.01)
(52) U.S. Cl.
CPC ........... *H04W 72/23* (2023.01); *H04W 72/21* (2023.01)

(58) Field of Classification Search
CPC .............................. H04W 72/23; H04W 72/21
(Continued)

(56) References Cited

U.S. PATENT DOCUMENTS

2011/0044196 A1   2/2011  Ishii
2013/0039292 A1   2/2013  Liu et al.
(Continued)

FOREIGN PATENT DOCUMENTS

EP   3133888 A1   2/2017
EP   3136640 A1   3/2017
(Continued)

OTHER PUBLICATIONS

3GPP, "3rd Generation Partnership Project; Technical Specification Group Radio Access Network; NR; Medium Access Control (MAC) protocol specification (Release 15) 3GPP TS 38.321 V15.3.0", 3GPP TS 38.321 V15.3.0, Sep. 2018, 1-76.
(Continued)

*Primary Examiner* — Rownak Islam
(74) *Attorney, Agent, or Firm* — Murphy, Bliak & Homiller, PLLC

(57) ABSTRACT

A wireless device (14) transmits an uplink transmission (16) to a radio network node (12). The wireless device (14) also transmits uplink transmission presence signaling (18) that indicates, or is usable to detect, the presence of the uplink transmission (16). The wireless device (14) further transmits, to the radio network node (12), control signaling (22) that indicates or requests a change in a configuration with which the wireless device (14) transmits uplink transmission presence signaling (18).

20 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0249350 | A1 | 8/2016 | Koutsimanis et al. |
| 2016/0301515 | A1* | 10/2016 | Ouchi ................... H04W 72/21 |
| 2017/0163388 | A1 | 6/2017 | Wiemann et al. |
| 2017/0257889 | A1 | 9/2017 | Mukherjee et al. |
| 2017/0339648 | A1* | 11/2017 | Wang .................... H04W 52/38 |
| 2017/0359826 | A1 | 12/2017 | Islam et al. |
| 2018/0249374 | A1* | 8/2018 | Park .......................... H04L 5/00 |
| 2019/0036831 | A1* | 1/2019 | Li .......................... H04W 72/23 |
| 2020/0052770 | A1* | 2/2020 | Chen ................... H04W 72/046 |
| 2022/0021485 | A1 | 1/2022 | Singh et al. |

FOREIGN PATENT DOCUMENTS

| | | | | |
|---|---|---|---|---|
| WO | WO-2018059412 | A1 * | 4/2018 | .......... H04L 1/0003 |
| WO | 2018172862 | A1 | 9/2018 | |

OTHER PUBLICATIONS

3GPP, "3rd Generation Partnership Project; Technical Specification Group Radio Access Network; NR; Multiplexing and channel coding (Release 15)", 3GPP TS 38.212 V15.1.0, Mar. 2018, 1-94.

3GPP, "3rd Generation Partnership Project; Technical Specification Group Radio Access Network; NR; Physical channels and modulation (Release 15)", 3GPP TS 38.211 V15.2.0, Jun. 2018, 1-96.

3GPP, "3rd Generation Partnership Project; Technical Specification Group Radio Access Network; NR; Physical layer procedures for control (Release 15)", 3GPP TS 38.213 V15.0.0, Dec. 2017, 1-56.

3GPP, "3rd Generation Partnership Project; Technical Specification Group Radio Access Network; NR; Physical layer procedures for data (Release 15)", 3GPP TS 38.214 V15.2.0, Jun. 2018, 1-94.

3GPP, "3rd Generation Partnership Project; Technical Specification Group Radio Access Network; NR; Radio Resource Control (RRC) protocol specification (Release 15)", TS 38.331 V15.4.0, Dec. 2018, 1-474.

3GPP, "3rd Generation Partnership Project; Technical Specification Group Radio Access Network; NR; Radio Resource Control (RRC) protocol specification (Release 15)", 3GPP TS 38.331 V15.3.0, Sep. 2018, 1-445.

Dahlman, Erik, et al., "Transport-Channel Processing", 5G NR: The next generation wireless access technology. Academic Press, 2018, 172-173.

Ericsson, "Enhancement of Configured Grant for NR URLLC", 3GPP TSG-RAN1 Meeting #95, R1-1812162, Spokane, USA, Nov. 12-16, 2018, 1-11.

ETSI MCC, "Report of 3GPP TSG RAN2#100 meeting, Reno, Nevada, USA", 3GPP TSG-RAN WG2 meeting #101, R2-1801701, Athens, Greece,, Feb. 26-Mar. 2, 2018, 1-3.

LG Electronics, "Modifications on UL synchronous HARQ procedure", 3GPP TSG RAN WG1 #49bis, R1-072883, Orlando, US, Jun. 25-29, 2007, 1-5.

LG Electronics, "On the UE behaviour related to UL synchronous HARQ procedure", 3GPP TSG RAN WG1 #51, R1-074748, Jeju, Korea, Nov. 5-9, 2007, 1-6.

LG Electronics, "UL shared channel UE behaviour after ACK/NACK detection and UL synchronous HARQ", 3GPP TSG RAN WG1 #51bis, R1-080277, Sevilla, Spain, Jan. 14-18, 2008, 1-6.

Panasonic, "Clear Channel Assessment for UL Transmissions", 3GPP TSG-RAN WG1 Meeting 84, R1-160793, St Julian's, Malta, Feb. 15-19, 2016, 1-2.

3GPP, "3rd Generation Partnership Project; Technical Specification Group Radio Access Network; NR; Medium Access Control (MAC) protocol specification (Release 15) The present", 3GPP TS 38.321 V15.2.0, Jun. 2018, pp. 1-73.

3GPP, "3GPP TS 38.214 V15.3.0", 3rd Generation Partnership Project; Technical Specification Group Radio Access Network; NR; Physical layer procedures for data (Release 15), Sep. 2018, 1-96.

3GPP, "3rd Generation Partnership Project; Technical Specification Group Radio Access Network; NR; Multiplexing and channel coding (Release 15)", 3GPP TS 38.212 V15.3.0, Sep. 2018, 1-99.

LG Electronics, "Discussion on evaluation methodology for reliability", 3GPP TSG RAN WG1 Meeting #94, R1-1808535, Gothenburg, Sweden, Aug. 20-24, 2018, 1-3.

Panasonic, "UL HARQ behaviour with dynamic adaptive/non-adaptive operation", 3GPP TSG-RAN WG2 Meeting #60, R2-074854 (R1-07xxxx), Jeju, Korea, Nov. 5-9, 2007, 1-4.

* cited by examiner

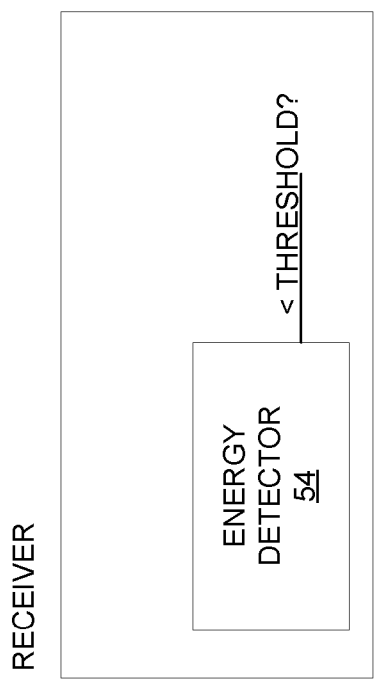
FIGURE 6
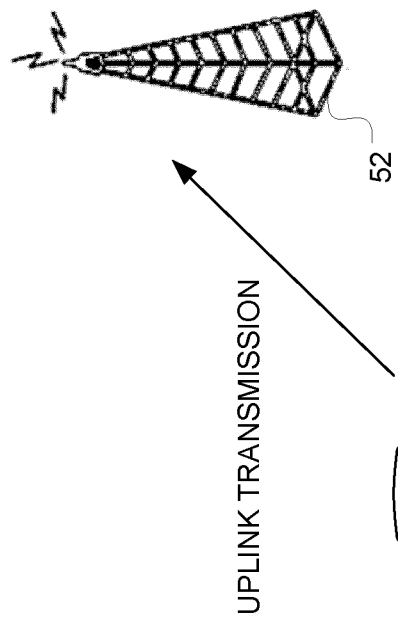
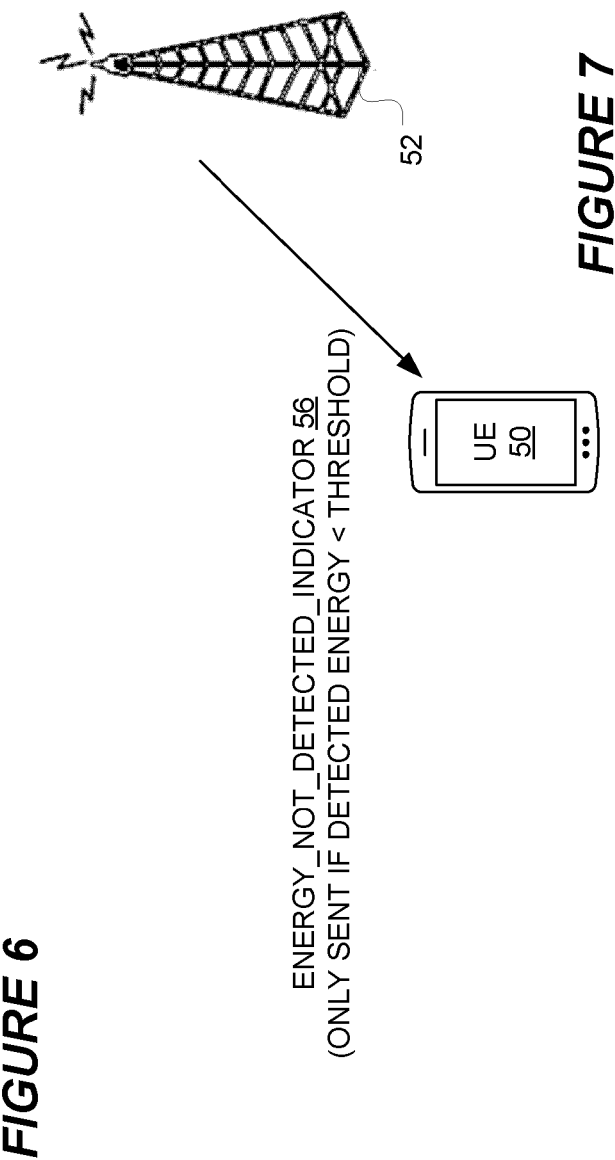
FIGURE 7

UPLINK TRANSMISSION PRESENCE DETECTION

TECHNICAL FIELD

The present disclosure relates to wireless communications, and in particular, to approaches for enabling a radio network node to detect the presence of an uplink transmission from a wireless device.

BACKGROUND

A configured uplink grant in a wireless communication network grants a wireless device a resource allocation which periodically recurs. This provides the wireless device with periodically recurring transmission opportunities in advance, so that the wireless device can transmit without having to receive a dynamic grant from the network. A configured uplink grant thereby reduces control signaling overhead that would have otherwise been attributable to dynamic grant transmission.

A configured uplink grant can be used in conjunction with an implicit acknowledgement scheme to realize further efficiencies. In this scheme, when the network receives a transmission but fails to decode it correctly, the network simply sends the wireless device an uplink grant for a re-transmission. This uplink grant effectively operates as a negative acknowledgement. By contrast, when the network receives a transmission and correctly decodes it, the network does not transmit any such uplink grant for re-transmission to the wireless device. In this scheme, then, the wireless device interprets the lack of an uplink grant as an implicit positive acknowledgement. Accordingly, no radio resources are needed for positive acknowledgement.

Some contexts nonetheless jeopardize the advantages realized by using a configured uplink grant in conjunction with an implicit acknowledgement scheme. If the wireless device does not have any data to transmit in a given transmission opportunity (e.g., due to the data being bursty in nature), it would be advantageous to let the device skip that transmission opportunity. Indeed, forcing the wireless device to use the transmission opportunity would waste energy and create interference. However, letting the wireless device skip the transmission opportunity creates challenges with regard to use of the implicit acknowledgement scheme. If the device performs a transmission in a transmission opportunity, but the network does not detect any such transmission, the network may erroneously assume that the device skipped the transmission opportunity. This means the wireless device will not receive any uplink grant for a re-transmission. But the wireless device may erroneously assume that the lack of any uplink grant for re-transmission means the network received and successfully decoded the transmission.

Challenges exist therefore in exploiting a configured uplink grant in conjunction with an implicit acknowledgement scheme, while also allowing a wireless device to skip a transmission opportunity.

SUMMARY

According to some embodiments herein, a wireless device transmits uplink transmission presence signaling that indicates, or is usable to detect, the presence of an uplink transmission. The network may monitor for this uplink transmission presence signaling in order to distinguish between the non-existence of an uplink transmission (which may be acceptable) and the erroneous reception of an uplink transmission (which may be unacceptable and trigger a negative acknowledgement). The uplink transmission presence signaling may enable a configured uplink grant to be used with an implicit acknowledgment scheme, while also allowing the wireless device to skip a transmission opportunity, e.g., if the device has no data to transmit.

For example, a base station may perform energy detection within resources allocated to a wireless device. The base station may do so in order to determine whether at least a threshold amount of energy exists within those resources (e.g., due to the uplink transmission presence signaling being transmitted on those resources) so as to suggest that the wireless device has performed an uplink transmission in the allocated resources. Using energy detection in this way to detect the mere presence of an uplink transmission from a wireless device may prove helpful in a number of contexts. One such context may be where the base station needs to distinguish between the non-existence of an uplink transmission (which may be acceptable) and the erroneous reception of an uplink transmission (which may be unacceptable and trigger a negative acknowledgement). This context may be realized for instance where the wireless device is configured with a configured uplink grant which grants the wireless device a resource allocation which periodically recurs. In these and other cases, the uplink transmission data rate, power consumption, and/or reliability may hinge at least in part on the base station being able to reliability detect the presence of an uplink transmission.

Further in this regard, some embodiments herein provide adaptive configuration of the uplink transmission presence signaling. Such adaptive configuration of uplink transmission presence signaling may advantageously provide for adaptive reliability of uplink transmission presence detection, e.g., as realized with different possible signaling configurations. Different possible signaling configurations in this regard may configure the uplink transmission presence signaling as different types of signals and/or as different configurations of a certain signal type (e.g., a demodulation reference signals, DMRS). The different types of signals and/or different configurations of a certain signal type may provide different degrees of uplink transmission presence detection reliability, with correspondingly different demands on radio resources, processing power, and/or power consumption. Some types of signals and/or signal configurations may for instance require different signal densities in time and/or frequency, with higher densities providing higher detection reliability but at the expense of increased radio resource loading. In some embodiments, then, the configuration and thereby reliability of uplink transmission presence signaling may be advantageously adapted, as needed on a dynamic or semi-static basis, to account for changing conditions in the network, e.g., related to fluctuations in channel conditions, desired error rate, radio resource demand, or the like.

More particularly, embodiments herein include a method performed by a wireless device. The method may comprise transmitting an uplink transmission to a radio network node. The method may further comprise transmitting uplink transmission presence signaling that indicates, or is usable to detect, the presence of the uplink transmission. In some embodiments, the method also comprises transmitting, to the radio network node, control signaling that indicates or requests a change in a configuration with which the wireless device transmits uplink transmission presence signaling.

In some embodiments, the method further comprises monitoring for feedback from the radio network node indicating that no uplink transmission presence signaling was detected, and determining whether or not to re-transmit the uplink transmission based at least in part on said monitoring.

In some embodiments, the uplink transmission presence signaling indicates, or is usable to detect, the presence of the uplink transmission within a resource allocation allocated to the wireless device and/or within a transmission occasion according to a configured uplink grant.

In some embodiments, the uplink transmission presence signaling comprises a certain type of signal. In this case, possible configurations with which the uplink transmission presence signaling is transmittable may include two or more different configurations of the certain type of signal. In one embodiment, for example, the two or more different configurations of the certain type of signal configure the certain type of signal to be transmitted with different densities in time and/or frequency.

In some embodiments, possible configurations with which the uplink transmission presence signaling is transmittable include two or more configurations that respectively configure the uplink transmission presence signaling as two or more different types of signals. In one such embodiment, the two or more different types of signals include two or more of: a demodulation reference signal; a phase tracking reference signal; and a dedicated uplink transmission presence signal that is dedicated for indicating presence of an uplink transmission from the wireless device.

In some embodiments, the uplink transmission presence signaling is transmittable with any of multiple configurations defined as possible for the uplink transmission presence signaling. In this case, the control signaling may indicate or request: a change to a specific one of the multiple configurations; or a change to any configuration in a subset of the multiple configurations.

In some embodiments, the control signaling indicates or requests a change in a density in time and/or frequency of the uplink transmission presence signaling and/or a change in a power of the uplink transmission presence signaling.

In some embodiments, the uplink transmission presence signaling comprises a demodulation reference signal.

In some embodiments, the control signaling explicitly indicates that the radio network node failed to detect uplink transmission presence signaling that the wireless device transmitted to the radio network node, and implicitly indicates or implicitly requests a change in a configuration with which the wireless device transmits uplink transmission presence signaling.

In some embodiments, the method further comprises, after transmitting the control signaling, receiving, from the radio network node, downlink control signaling that indicates: whether or not the radio network node acknowledges or approves of the wireless device transmitting uplink transmission presence signaling with a configuration indicated or requested by the control signaling; or a configuration, from among multiple possible configurations, with which the wireless device is to transmit uplink transmission presence signaling. In one such embodiment, the downlink control signaling comprises physical layer signaling.

Embodiments herein also include a method performed by a radio network node. The method may comprise receiving, from a wireless device, control signaling that indicates or requests a change in a configuration with which the wireless device transmits uplink transmission presence signaling. The method may also comprise monitoring for uplink transmission presence signaling that indicates, or is usable to detect, the presence of an uplink transmission from the wireless device.

In some embodiments, the method further comprises, responsive to receiving the control signaling, transmitting, to the wireless device, downlink control signaling that indicates: whether or not the radio network node acknowledges or approves of the wireless device transmitting uplink transmission presence signaling with a configuration indicated or requested by the control signaling; or a configuration, from among multiple possible configurations, with which the wireless device is to transmit uplink transmission presence signaling. In one such embodiment, said monitoring comprises monitoring for the uplink transmission presence signaling with a configuration indicated by the downlink control signaling. Alternatively or additionally, in some embodiments, the downlink control signaling comprises physical layer signaling.

In some embodiments, the method further comprises transmitting feedback from the radio network node to the wireless device indicating that no uplink transmission presence signaling was detected according to said monitoring.

In some embodiments, the uplink transmission presence signaling indicates, or is usable to detect, the presence of the uplink transmission within a resource allocation allocated to the wireless device and/or within a transmission occasion according to a configured uplink grant.

In some embodiments, the uplink transmission presence signaling comprises a certain type of signal. In this case, possible configurations with which the uplink transmission presence signaling is transmittable may include two or more different configurations of the certain type of signal. In one such embodiment, the two or more different configurations of the certain type of signal configure the certain type of signal to be transmitted with different densities in time and/or frequency.

In some embodiments, possible configurations with which the uplink transmission presence signaling is transmittable include two or more configurations that respectively configure the uplink transmission presence signaling as two or more different types of signals. In one such embodiment, the two or more different types of signals include two or more of: a demodulation reference signal; a phase tracking reference signal; and a dedicated uplink transmission presence signal that is dedicated for indicating presence of an uplink transmission from the wireless device.

In some embodiments, the uplink transmission presence signaling is transmittable with any of multiple configurations defined as possible for the uplink transmission presence signaling. In this case, the control signaling may indicate or request: a change to a specific one of the multiple configurations; or a change to any configuration in a subset of the multiple configurations.

In some embodiments, the control signaling indicates or requests a change in a density in time and/or frequency of the uplink transmission presence signaling and/or a change in a power of the uplink transmission presence signaling.

In some embodiments, the uplink transmission presence signaling comprises a demodulation reference signal.

In some embodiments, the control signaling explicitly indicates that the radio network node failed to detect uplink transmission presence signaling that the wireless device transmitted to the radio network node, and implicitly indicates or implicitly requests a change in a configuration with which the wireless device transmits uplink transmission presence signaling.

Embodiments herein also include corresponding apparatus, computer programs, and carriers such as non-transitory computer-readable storage mediums. For example, embodiments herein include a wireless device. The wireless device may be configured to transmit an uplink transmission to a radio network node. The wireless device may further be configured to transmit uplink transmission presence signaling that indicates, or is usable to detect, the presence of the uplink transmission. In some embodiments, the wireless device also is configured to transmit, to the radio network node, control signaling that indicates or requests a change in a configuration with which the wireless device transmits uplink transmission presence signaling.

Embodiments herein further include a radio network node. The radio network node may be configured to receive, from a wireless device, control signaling that indicates or requests a change in a configuration with which the wireless device transmits uplink transmission presence signaling. The radio network node may also be configured to monitor for uplink transmission presence signaling that indicates, or is usable to detect, the presence of an uplink transmission from the wireless device.

BRIEF DESCRIPTION OF THE DRAWINGS

FIG. 6 is a block diagram of user equipment (UE) and gNB according to some embodiments.

FIG. 7 is a block diagram of user equipment (UE) and gNB according to other embodiments.

DETAILED DESCRIPTION

Figure 1:
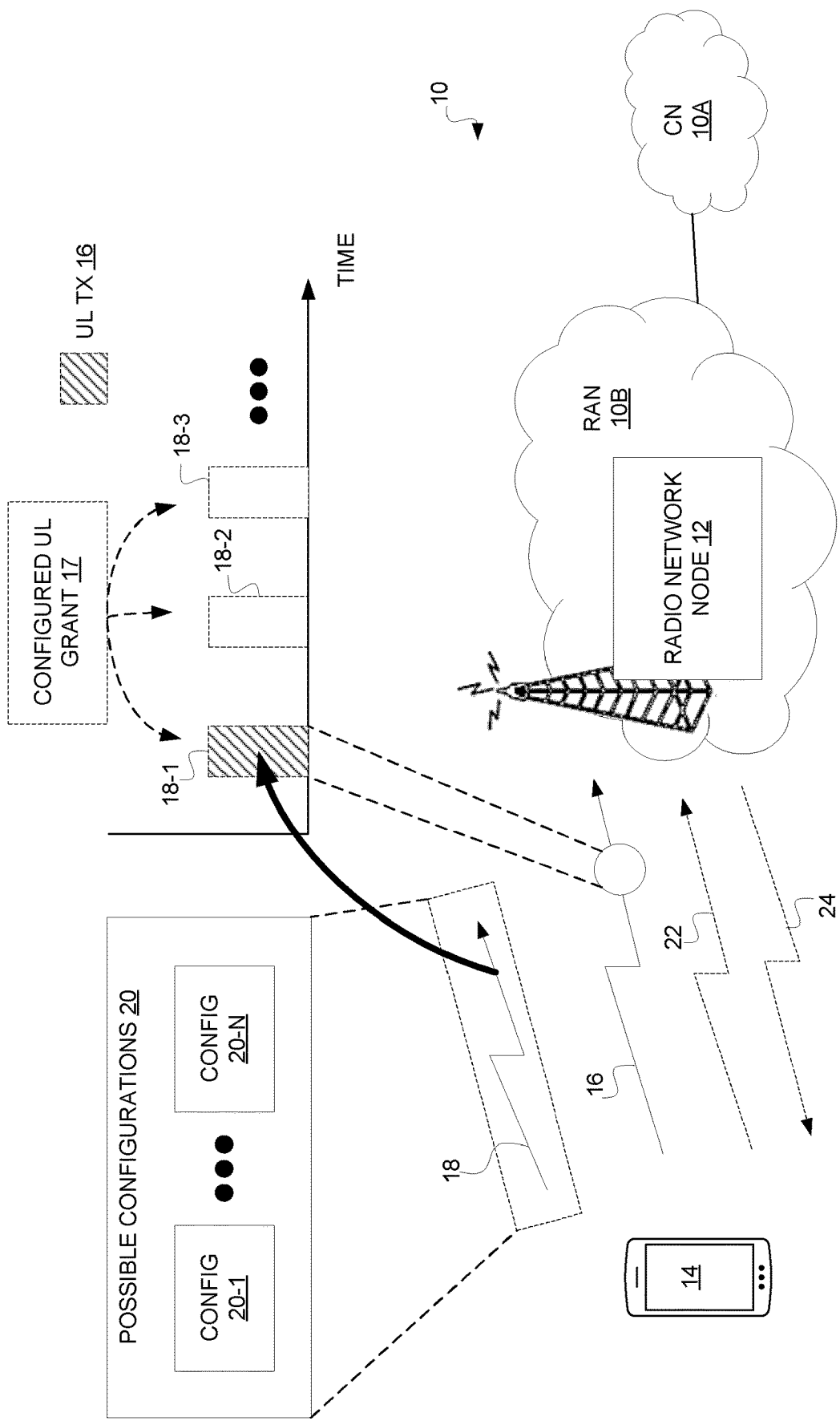
FIG. 1 is a block diagram of a wireless communication network according to some embodiments.

FIG. 1 shows a wireless communication network 10 (e.g., a 5G network) according to some embodiments. The network 10 includes a core network (CN) 10A (e.g., a 5G Core, 5GC) and a radio access network (RAN) 10B (e.g., a New Radio, NR, network). The RAN 10B includes one or more radio network nodes 12 (e.g., one or more base stations, such as one or more gNBs) for providing radio access to wireless devices (WD) (e.g., user equipments, UEs), one of which is shown as WD 14. Via this radio access, a wireless device 14 connects to the CN 10A, which in turn may provide the wireless device 14 with access to one or more external networks (not shown), such as the Internet.

The wireless device 14 may be configured to transmit an uplink transmission 16 to the radio network node 12. The uplink transmission 16 may for instance convey user data to the radio network node 12 and/or be performed on a data channel, such as a physical uplink shared channel (PUSCH). In some embodiments, the uplink transmission 16 is an uplink grant-free (GF) transmission that the wireless device 14 transmits without having received a dynamic grant from the radio network node 12. In one or more embodiments, for example, the uplink transmission 16 is instead performed based on a configured uplink grant 17. In this case, the radio network node 12 configures the wireless device 14 (e.g., at least partly via radio resource control, RRC, signaling) with a configured uplink grant 17. In the context of NR, for instance, the configured uplink grant 17 may be of Type 1 (fully configured via RRC) or of Type 2 (partly configured via RRC and partly configured via downlink control information, DCI), as described more fully hereinafter. Regardless, FIG. 1 shows that the wireless device 14 with this configured uplink grant 17 is granted a resource allocation (e.g., in time and/or frequency) that periodically occurs so as to provide periodically recurring transmission occasions 18-1, 18-2, 18-3, . . . in which the wireless device 14 may transmit in the uplink (also referred to as transmission opportunities 18-1, 18-2, 18-3 . . . ). In these and other embodiments, then, the uplink transmission 16 that the wireless device 14 transmits to the radio network node 12 may be performed within a resource allocation allocated to the wireless device 14 for uplink transmission with a configured uplink grant 17 and/or be performed within a transmission occasion that periodically recurs based on the configured uplink grant 17.

The wireless device 14 as shown in FIG. 1 may also be configured to transmit signaling 18 to the radio network node 12, hereinafter referred to purely for convenience as so-called uplink transmission presence signaling 18. Uplink transmission presence signaling 18 as used herein may refer to any signaling (distinguishable from the uplink transmission 16 itself) which indicates, or is usable to detect, the presence of an uplink transmission 16 by the wireless device 14, e.g., within a resource allocation allocated to the wireless device 14 and/or within a transmission occasion according to a configured uplink grant 17. FIG. 1 in this regard shows as an example that the wireless device 14 transmits uplink transmission presence signaling 18 as signaling which indicates, or is usable to detect, the presence of uplink transmission 16 by the wireless device 14 within transmission occasion 18-1 of a configured uplink grant 17. Regardless, uplink transmission presence signaling 18 in one or more embodiments may indicate, or be usable to detect, the presence of an uplink transmission 16 in the sense that it indicates or is usable to detect the mere existence of the uplink transmission 16, without necessarily indicating or being usable to recover the underlying data conveyed by the uplink transmission 16 and/or without necessarily indicating or being usable to detect the type or other characteristic of the uplink transmission 16. In fact, the uplink transmission presence signaling 18 in one or more embodiments may simply indicate or be usable to detect that a level of energy consistent with an uplink transmission 16 (e.g., as opposed to noise or interference) exists within a resource allocation allocated to the wireless device 14.

In these and other embodiments, then, the radio network node 12 may use the uplink transmission presence signaling 18 to detect whether or not an uplink transmission 16 from the wireless device is present, e.g., within a resource allocation allocated to the wireless device 14 and/or within a transmission occasion according to or corresponding to a configured uplink grant 17. In embodiments where the uplink transmission presence signaling 18 is also transmitted within the resource allocation and/or within the transmission occasion, the radio network node 12 may do so by performing energy detection on the resource allocation and/or within the transmission occasion, in an attempt to detect at least a threshold level of energy from the uplink transmission presence signaling 18.

In some embodiments, when the radio network node 12 does not detect the uplink transmission presence signaling 18, the radio network node 12 may transmit feedback (not shown) to the wireless device 14 (e.g., via DCI) indicating that no such uplink transmission presence signaling 18 was detected. This feedback may be referred to in some embodiments below as an energy_not_detected_indicator. Regardless, the radio network node 12 may do so as part of an implicit hybrid automatic repeat request (HARQ) feedback scheme. In this case, then, the wireless device 14 may determine whether to perform an uplink re-transmission based at least in part on the received feedback. Alternatively or additionally to transmitting such feedback, the radio network node 12 may determine whether or not to demodulate and/or decode an uplink transmission 16 based on whether or not the radio network node 12 detects any uplink transmission presence signaling 16.

Notably, FIG. 1 shows that uplink transmission presence signaling 18 herein may be transmitted with or according to any of multiple possible configurations 20, shown as configurations 20-1, . . . 20-N. That is, uplink transmission presence signaling 18 may have any of the multiple configurations 20 defined as possible for that signaling 18. In some embodiments, for example, the multiple possible configurations 20 include two or more different configurations of a certain type of signal. The two or more different configurations of the certain type of signal may for instance configure the certain type of signal to be transmitted with different respective densities, e.g., in time and/or frequency. For example, in embodiments where the certain type of signal is a demodulation reference signal (DMRS), the two or more different configurations may configure the DMRS to be transmitted with different respective densities in time and/or frequency, e.g., such that the DMRS may be transmitted more densely in time and/or frequency with one configuration than another.

Alternatively or additionally, the multiple possible configurations 20 may include two or more configurations that respectively configure the uplink transmission presence signaling 18 as two or more different types of signals. That is, according to at least some of the different configurations 20, the uplink transmission presence signaling 18 may comprise or take the form of different types of signals.

For example, the different types of signals may include a DMRS, a phase tracking reference signal (PT-RS) (e.g., as defined for NR), and/or a signal dedicated exclusively for indicating or being usable to detect the presence of an uplink transmission. In some embodiments, for instance, such a dedicated signal is distinguishable from a DMRS and/or PT-RS in that the dedicated signal is not also used or usable for estimating the radio channel for demodulation of the uplink transmission 16 and is not usable for tracking local oscillator phase. In fact, in some embodiments, such a dedicated signal may be a specially defined sequence that can be securely detected on reserved resources, with the only usage of the dedicated signal being for uplink transmission presence detection. Where the different types of signals include a DMRS, the radio network node 12 may perform energy detection based on baseband signals and using DMRS sequence detection. That is, the radio network node 12 may perform DMRS sequence detection assuming the wireless device 14 has transmitted the uplink transmission 16 and associated DMRS according to its configured uplink grant 16. The DMRS may in this case then be used both for channel estimation for demodulation as well as for uplink transmission presence detection. Other types of signals besides those mentioned as examples are possible however.

In some embodiments, the different possible configurations 20 of uplink transmission presence signaling 18 are associated with or correspond to different degrees of signaling detectability/performance. For example, when uplink transmission presence signaling 18 has configuration 20-1, the radio network node 12 may be able to more easily detect the signaling 18 (e.g., according to more relaxed signal strength/quality criteria) than when the uplink transmission presence signaling 18 has configuration 20-N. Configuration 20-1 may however consume more radio resources so as to contribute greater signaling overhead. That is, in some embodiments, the different possible configurations 20 allocate different respective amounts of radio resources to uplink transmission presence signaling 18. Accordingly, in one or more embodiments, the different configurations 20 reflect different balances between radio resource consumption and uplink transmission presence signaling performance.

No matter the particular nature or mix of the different possible configurations 20 for the uplink transmission presence signaling 18, the wireless device 14 in some embodiments is configured to transmit control signaling 22 shown in FIG. 1 to the radio network node 12. In one or more embodiments, the control signaling 22 indicates or requests a change in the configuration with which the wireless device 14 transmits the uplink transmission presence signaling 18, e.g., from among the possible configurations 20 for that signaling 18. The change may be indicated to take effect at a specified time, or may be predefined to take effect at a predefined absolute or relative time, e.g., the next time the uplink transmission presence signaling 18 is to be transmitted, such as in or in association with the next transmission occasion corresponding to the configured uplink grant 17. By providing a mechanism to indicate or request such a change, some embodiments herein advantageously provide adaptive uplink transmission presence signaling performance. In one or more embodiments applied in the context of a configured uplink grant, this may in turn improve the reliability of uplink configured grant transmission.

In any event, the control signaling 22 may indicate or request a specified change in the configuration with which the wireless device 14 transmits the uplink transmission presence signaling 18, by indicating or requesting that the configuration is to change to a specific one of the possible configurations 20. Alternatively, the control signaling 22 may indicate or request an unspecified change, by indicating or requesting a change without indicating to which specific one of the possible configurations 20 the change is to be made. In still other embodiments, the control signaling 22 may indicate or request a semi-specified change, by indicating or requesting that the configuration with which the wireless device 14 transmits the uplink transmission presence signaling 18 is to change to any of the configurations in a subset of the possible configurations 20. For example, the subset may include those of the possible configurations 20 that provide better uplink transmission presence signaling performance (e.g., in the sense discussed above) than that provided by a current or previous configuration with which the wireless device transmitted the uplink transmission presence signaling 18. Alternatively or additionally, the subset may include those of the possible configurations 20 that allocate more radio resources to the uplink transmission presence signaling 18 than the radio resources allocated by a current or previous configuration with which the wireless device transmitted the uplink transmission presence signaling 18.

Consider an example in which the possible configurations 20 include different configurations of a DMRS, with the different configurations allocating different amounts of radio resources to the DMRS in time and/or frequency. In this example, the control signaling 18 may take the form of a request for the wireless device 14 to (be allowed to) transmit a DMRS that is more dense in time and/or frequency than a DMRS that the wireless device 14 previously transmitted. Some embodiments below exemplify the control signaling 22 in this case as an ask-for-dense-DMRS signal or message, e.g., in the context of NR. In some embodiments, the control signaling 22 in this example may request a specific configuration of the DMRS, e.g., so as to request a certain DMRS density. In other embodiments, though, the control signaling 22 may just generally request an increase in DMRS density, without specifying the extent or degree of that increase. In still other embodiments, the different configurations may allocate different amounts of power to the DMRS.

Although described above in the context of a change from one configuration to another, any given instance of the control signaling 22 itself may or may not describe or mention such a change. Instead, the control signaling 22 may just effect or produce the change. In one or more other embodiments, then, the control signaling 22 itself may just indicate or request a configuration with which the wireless device 14 is to transmit the uplink transmission presence signaling 18. Similarly to above, the control signaling 22 may indicate or request a specific one of the possible configurations with which the wireless device 14 is to transmit the uplink transmission presence signaling 18. Or, the control signaling 22 may just semi-specify the configuration that is indicated or requested, e.g., as being one of multiple configurations in a subset of the possible configurations 20 similar to that described above.

In some embodiments, the control signaling 22 is transmitted to the radio network node 12 on an uplink control channel. For example, the uplink control channel may be a physical uplink control channel (PUCCH).

In some embodiments, the control signaling 22 described above is explicit, e.g., in the sense that it explicitly indicates or requests a change in the configuration with which the wireless device 14 transmits the uplink transmission presence signaling 18, or explicitly indicates or requests a configuration with which the wireless device 14 is to transmit the uplink transmission presence signaling 18. In other embodiments, the control signaling 22 described above is only implicit. In this sense, the control signaling 22 may implicitly indicate or request such a change, or implicitly indicate or request such a configuration. As an example of implicit control signaling 22, for instance, the control signaling 22 may merely be transmitted under circumstances or conditions that imply such a change or configuration is indicated or requested.

Consider an example. In some embodiments, the radio network node 12 transmits feedback (e.g., in the form of an energy_not_detected_indicator) to the wireless device 14 (e.g., via DCI) indicating when the radio network node 12 fails to detect any uplink transmission presence signaling 18, e.g., within a resource allocation and/or transmission occasion corresponding to a configured uplink grant 17. In some embodiments, the wireless device 14 is configured to transmit the control signaling 22 to the radio network node in response to receiving such feedback, if the wireless device 14 had indeed transmitted uplink transmission presence signaling 18, e.g., within that resource allocation and/or transmission occasion. The control signaling 22 therefore indicates to the radio network node 12 that the radio network node 12 failed to detect uplink transmission presence signaling 18 that the wireless device 14 actually transmitted to the radio network node 12. This may imply for instance that the radio network node's failure to detect the uplink transmission presence signaling 18 was attributable to something other than the wireless device 14 not transmitting such signaling 18. For example, such failure may be deemed attributable to the used configuration of the uplink transmission presence signaling 18 providing insufficient performance and/or insufficient radio resource allocation (e.g., density). In these and other examples, then, the control signaling 22 may itself just explicitly indicate that the radio network node 12 failed to detect uplink transmission presence signaling 18 that the wireless device 14 transmitted to the radio network node 12. But such signaling 22 may impliedly indicate, impliedly request, trigger, or otherwise cause a change in the configuration with which the wireless device 14 transmits the uplink transmission presence signaling 18.

Although exemplified in some embodiments above as being transmitted in response to feedback from the radio network node 12 regarding its detection of uplink transmission presence signaling 18, the control signaling 22 may be transmitted without regard to such feedback in other embodiments. In some embodiments, for example, the wireless device 14 autonomously decides whether to transmit the control signaling 22, and/or autonomously decides on what the control signaling 22 is to indicate or request, e.g., based on the wireless device's own evaluation of the need for such control signaling 22 and/or the need for configuration change. In one or more embodiments in this regard, the wireless device 14 performs measurements (e.g., in the form of signal-to-interference-plus-noise, SINR, measurements or other types of signal/channel measurements), and makes the autonomous decision(s) regarding the control signaling 22 based at least in part on such measurements. The decisions may for instance assume some degree of reciprocity between uplink and downlink channels, at least within the allocated resources and/or transmission occasion corresponding to the configured uplink grant. Alternatively or additionally, the wireless device 14 may base its autonomous decision in this regard on channel measurement reports received from the radio network node 12, indicating the radio network node's uplink channel measurements. Such measurements may for instance be on the uplink channel that the uplink transmission presence signaling 18 is to be transmitted, or on a different uplink channel, e.g., which is assumed to have the same or similar channel conditions.

No matter the particular nature or form of the control signaling 22, or its basis for transmission, the radio network node 12 correspondingly receives that control signaling 22. In some embodiments, the radio network node 12 need not respond to the control signaling 22 with acknowledgement, approval, or configuration signaling before the wireless device 14 is allowed to transmit the uplink transmission presence signaling 18 consistent with the control signaling 22. Instead, the radio network node 12 may simply be configured to process the uplink transmission presence signaling 22 (the next time it is received) according to the received control signaling 22.

In other embodiments, by contrast, the radio network node 12 is configured to transmit downlink control signaling 24 to the wireless device 14. In some embodiments, downlink control signaling 24 is transmitted as a response to the (uplink) control signaling 22 from the wireless device 14. In one or more of these embodiments, the downlink control signaling 24 may explicitly or implicitly indicate whether or not the radio network node 12 acknowledges or approves of the wireless device 14 transmitting the uplink transmission presence signaling 18 with the configuration indicated or requested by the control signaling 22. Alternatively or additionally, the downlink control signaling 24 may comprise configuration signaling that indicates a configuration, from among the possible configurations 20, with which the wireless device 14 is to transmit the uplink transmission presence signaling 18.

Consider an example in which the possible configurations 20 include different configurations of a DMRS, with the different configurations allocating different amounts of radio resources to the DMRS in time and/or frequency. In this example, the downlink control signaling 24 may indicate that the wireless device 14 is to transmit a DMRS with a certain configuration, e.g., which has a denser or higher density in time and/or frequency than one or more other possible configurations of the DMRS. Some embodiments below exemplify the downlink control signaling 24 in this case as a configure-dense-DMRS signal or message, e.g., in the context of NR.

In one or more embodiments, the radio network node 12 transmits the downlink control signaling 24 on a semi-static basis, e.g., as RRC signaling in one or more RRC messages and/or RRC configurations. In this case, the downlink control signaling 24 may be transmitted on an as-needed or per-need basis. In other embodiments, by contrast, the radio network node 12 transmits the downlink control signaling 24 on a dynamic basis, e.g., as downlink control information (DCI) in one or more DCI messages. These embodiments may advantageously lead to a relatively faster uplink transmission detection reliability increase, compared to RRC configuration.

In some embodiments, the radio network node 12 determines the configuration, from among the possible configurations 20, with which the wireless device 14 is to transmit the uplink transmission presence signaling 18, based exclusively on the control signaling 22 from the wireless device 14. In other embodiments, the radio network node 12 bases that determination based only partly on the control signaling 22 received from the wireless device 14, e.g., taking the control signaling 22 from the device into account as a request or suggestion, but also taking into account other knowledge at the radio network node 12. This other knowledge may include for instance measurements performed by the radio network node 12 itself, measurement reports received from the wireless device 14, loading at the radio network node 12, demands placed on radio resources which would be required to change the configuration of the uplink transmission presence signaling 18, historical or expected error rates attributable to different configurations of the uplink transmission presence signaling, or the like. The radio network node 12 may for instance take into account current or historical measurements/performance of the uplink transmission presence signaling 18, the channel over which that signaling 18 is transmitted, or other signal(s) or channel(s) deemed to have representative channel conditions (e.g., a sounding reference signal, SRS). If for instance the historical measurement or performance of the uplink transmission presence signaling 18 suggests that a change in the configuration is not needed, the radio network node 12 may decide not to change the configuration.

In still other embodiments, the radio network node 12 transmits the downlink control signaling 24 without regard to control signaling 22 from the wireless device 14. Indeed, in one or more such embodiments, no such control signaling 22 is transmitted or received. In some embodiments, for example, the radio network node 12 itself determines the configuration, from among the possible configurations 20, with which the wireless device 14 is to transmit the uplink transmission presence signaling 18, e.g., based on any of the knowledge at the radio network node 12 described above. Accordingly, the radio network node 12 may transmit the downlink control signaling 24 as needed, in response to detecting a need for a change in the configuration with which the wireless device 14 transmits the uplink transmission presence signaling 18 (e.g., a need for increased DMRS density for improved energy detection probability).

In yet other embodiments, particularly where the radio network node 12 transmits the downlink control signaling 24 without regard to control signaling 22, the downlink control signaling 24 may indicate or request a change in the configuration with which the wireless device 14 transmits the uplink transmission presence signaling 18, e.g., from among the possible configurations 20 for that signaling 18. The change indicated may be specified, unspecified, or semi-specified, similarly as described above for control signaling 22.

In view of the above modifications and variations, some embodiments herein generally include a wireless device 14 transmitting the control signaling 22 described herein to the radio network node 12. In some of those embodiments, the control signaling 22 is transmitted after or in response to feedback (e.g., energy_not_detected_indicator) from the radio network node 12 indicating that it failed to detect uplink transmission presence signaling 18. In others of those embodiments, though, no such feedback exists or the control signaling 22 is not transmitted after or in response to that feedback.

Alternatively or additionally, some embodiments herein include a radio network node 12 transmitting downlink control signaling 24 to the wireless device 14. In some of those embodiments, the downlink control signaling 24 is transmitted after or in response to the control signaling 22 from the wireless device 14. In others of those embodiments, though, no such control signaling 22 exists or the downlink control signaling 24 is not transmitted after or in response to that control signaling 22.

In general, then, embodiments herein may include any number of possible permutations of feedback (e.g., energy_not_detected_indicator), control signaling 22, and downlink control signaling 24. For example, some embodiments involve only control signaling 22, not the feedback and not the downlink control signaling 24. Other embodiments involve only downlink control singalling 24, not the feedback and not the control signaling 22. Still other embodiments involve the feedback and control signaling 22, but not the downlink control signaling 24. Yet other embodiments involve the feedback and downlink control signaling 24, but not the control signaling 22. Further embodiments involve control signaling 22 and downlink control signaling 24, but not the feedback. Moreover, other embodiments involve the feedback, control signaling 22, and the downlink control signaling 24.

Note that although some embodiments herein are exemplified with a single radio network node 12, in other embodiments herein the different signals may be transmitted to or from different radio network nodes. For example, in some embodiments, the wireless device 14 transmits control signaling 22 to a different radio network node than the radio network node to which it transmitted the uplink transmission 16, e.g., during or after a handover to the different radio network node.

Figure 2:
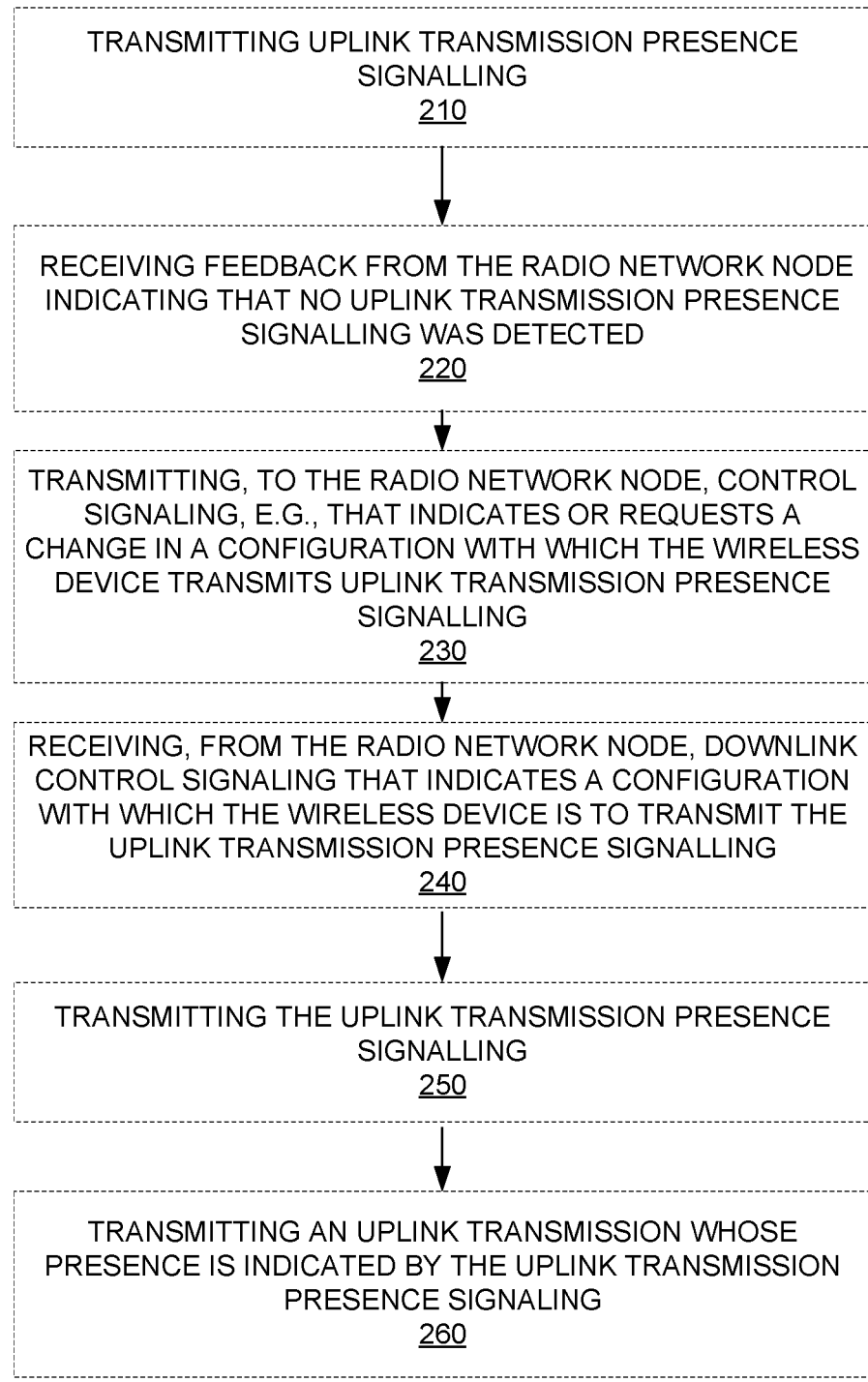
FIG. 2 is a logic flow diagram of a method performed by a wireless device according to some embodiments.

In view of the above modifications and variations, FIG. 2 depicts a method performed by a wireless device 14 in accordance with particular embodiments. The method as shown may include transmitting uplink transmission presence signaling 18, e.g., according to one of the possible configurations 20 (Block 210). In some embodiments, the uplink transmission presence signaling 18 indicates, or is usable to detect, the presence of an uplink transmission 16 by the wireless device 14, e.g., within a resource allocation allocated to the wireless device 14 and/or within a transmission occasion according to a configured uplink grant 17. The method in some embodiments may alternatively or additionally include receiving feedback from the radio network node 12 indicating that no uplink transmission presence signaling 18 was detected by the radio network node 12 (Block 220).

In some embodiments, the method may alternatively or additionally include transmitting, to the radio network node 12, control signaling 22 (Block 230). In some embodiments, control signaling 22 indicates or requests a change in a configuration with which the wireless device 14 transmits the uplink transmission presence signaling 22. Alternatively or additionally, control signaling 22 may indicate or request a configuration (e.g., from among multiple possible configurations) with which the wireless device 14 is to transmit uplink transmission presence signaling 22.

In some embodiments, the method may alternatively or additionally include receiving, from the radio network node 12, downlink control signaling 24, e.g., downlink control information (DCI) (Block 240). In one or more embodiments, the downlink control signaling 24 indicates a configuration with which the wireless device 14 is to transmit the uplink transmission presence signaling 18, e.g., for indicating an uplink transmission 16 within the next transmission occasion corresponding to the configured uplink grant 17.

Alternatively or additionally, the method may further include transmitting the uplink transmission presence signaling 18, e.g., according to the control signaling 22 and/or downlink control signaling 24 (Block 250). Alternatively or additionally, the method may include transmitting an uplink transmission 16 whose presence is indicated by the uplink transmission presence signaling 18 (Block 260).

In some embodiments, possible configurations with which the uplink transmission presence signaling 18 is transmittable include two or more configurations that respectively configure the uplink transmission presence signaling 18 as two or more different types of signals. In one such embodiment, the two or more different types of signals include two or more of: a demodulation reference signal; a phase tracking reference signal; and a dedicated uplink transmission presence signal that is dedicated for indicating presence of an uplink transmission from the wireless device 14.

In some embodiments, the uplink transmission presence signaling 18 comprises a certain type of signal, e.g., a demodulation reference signal. In this case, possible configurations with which the uplink transmission presence signaling 18 is transmittable may include two or more different configurations of the certain type of signal. In one embodiment, for example, the two or more different configurations of the certain type of signal configure the certain type of signal to be transmitted with different densities in time and/or frequency.

Figure 3:
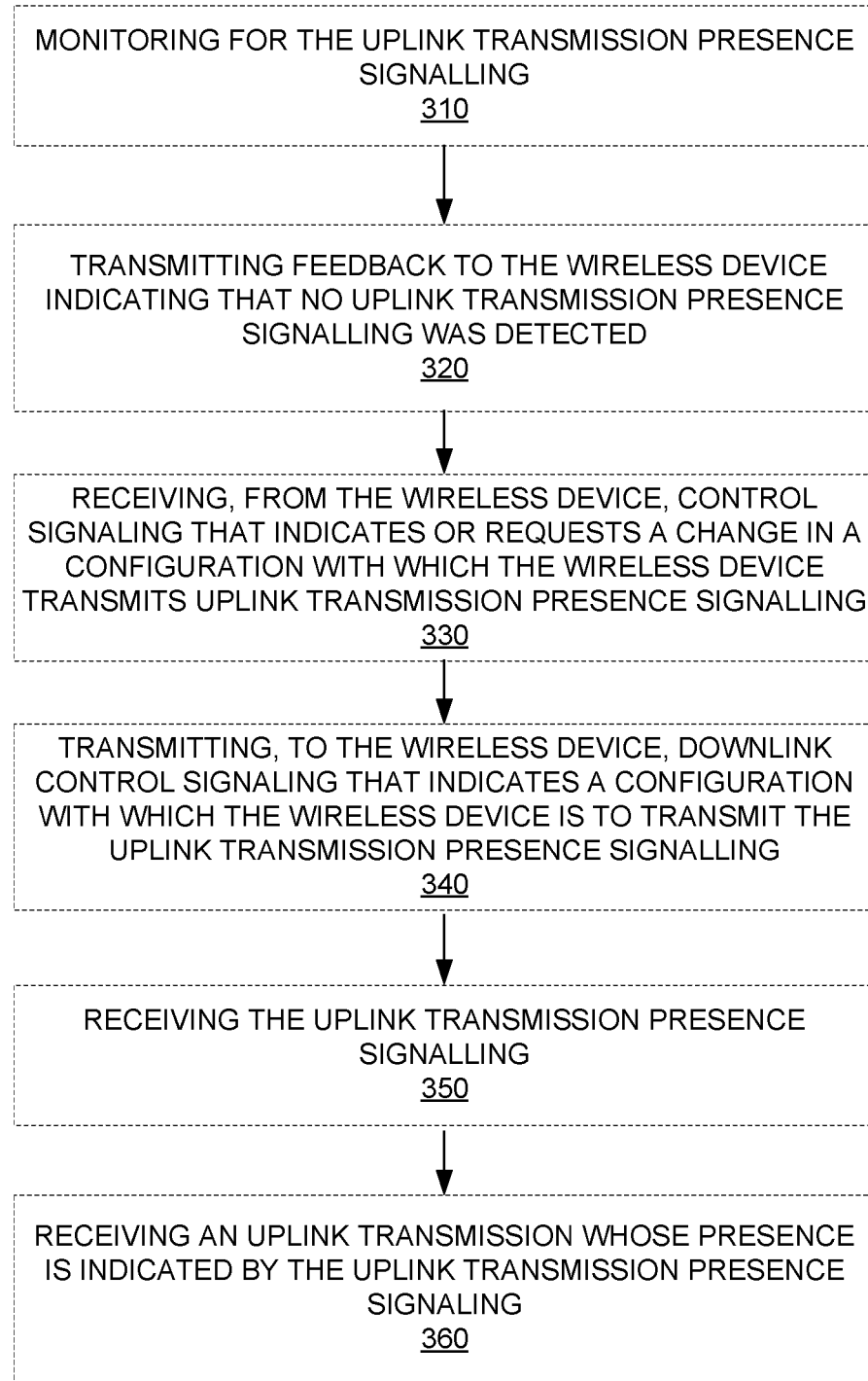
FIG. 3 is a logic flow diagram of a method performed by a radio network node according to some embodiments.

FIG. 3 depicts a method performed by a radio network node 12 in accordance with particular embodiments. The method as shown may include monitoring for uplink transmission presence signaling 18, e.g., according to one of the possible configurations 20 (Block 310). In some embodiments, the uplink transmission presence signaling 18 indicates, or is usable to detect, the presence of an uplink transmission 16 by the wireless device 14, e.g., within a resource allocation allocated to the wireless device 14 and/or within a transmission occasion according to a configured uplink grant 17. The method in some embodiments may alternatively or additionally include transmitting feedback to the wireless device 14 indicating that no uplink transmission presence signaling 18 was detected by the radio network node 12 (Block 320).

In some embodiments, the method may alternatively or additionally include receiving, from the wireless device 14, control signaling 22 (Block 330). In some embodiments, control signaling 22 indicates or requests a change in a configuration with which the wireless device 14 transmits the uplink transmission presence signaling 22. Alternatively or additionally, control signaling 22 may indicate or request a configuration with which the wireless device 14 is to transmit uplink transmission presence signaling 22.

In some embodiments, the method may alternatively or additionally include transmitting, to the wireless device 14, downlink control signaling 24, e.g., downlink control information (DCI) (Block 340). In one or more embodiments, the downlink control signaling 24 indicates a configuration with which the wireless device 14 is to transmit the uplink transmission presence signaling 18, e.g., for indicating an uplink transmission 16 within the next transmission occasion corresponding to the configured uplink grant 17.

Alternatively or additionally, the method may further include monitoring for and/or receiving the uplink transmission presence signaling 18, e.g., according to the control signaling 22 and/or downlink control signaling 24 (Block 350). Alternatively or additionally, the method may include receiving an uplink transmission 16 whose presence is indicated by the uplink transmission presence signaling 18 (Block 360).

In some embodiments, possible configurations with which the uplink transmission presence signaling 18 is transmittable include two or more configurations that respectively configure the uplink transmission presence signaling 18 as two or more different types of signals. In one such embodiment, the two or more different types of signals include two or more of: a demodulation reference signal; a phase tracking reference signal; and a dedicated uplink transmission presence signal that is dedicated for indicating presence of an uplink transmission from the wireless device 14.

In some embodiments, the uplink transmission presence signaling 18 comprises a certain type of signal, e.g., a demodulation reference signal. In this case, possible configurations with which the uplink transmission presence signaling 18 is transmittable may include two or more different configurations of the certain type of signal. In one embodiment, for example, the two or more different configurations of the certain type of signal configure the certain type of signal to be transmitted with different densities in time and/or frequency.

Although not shown, other embodiments herein include a method performed by a wireless device 14. The method includes transmitting, to a radio network node 12, control signaling 22 that requests an increase in a density in time and/or frequency of a demodulation reference signal to be transmitted by the wireless device 14. A corresponding method performed by the radio network node 12 may include receiving, from a wireless device 14, control signaling 22 that requests an increase in a density in time and/or frequency of a demodulation reference signal to be transmitted by the wireless device 14.

Other embodiments herein include a method performed by a wireless device 14. The method includes transmitting, to a radio network node 12, a signal dedicated for indicating, or being usable to detect, the presence of an uplink transmission by the wireless device 14. A corresponding method performed by the radio network node 12 may include receiving, from a wireless device 14, a signal dedicated for indicating, or being usable to detect, the presence of an uplink transmission by the wireless device 14.

Embodiments herein also include corresponding apparatuses. Embodiments herein for instance include a wireless device 14 configured to perform any of the steps of any of the embodiments described above for the wireless device 14.

Embodiments also include a wireless device 14 comprising processing circuitry and power supply circuitry. The processing circuitry is configured to perform any of the steps of any of the embodiments described above for the wireless device 14. The power supply circuitry is configured to supply power to the wireless device 14.

Embodiments further include a wireless device 14 comprising processing circuitry. The processing circuitry is configured to perform any of the steps of any of the embodiments described above for the wireless device 14. In some embodiments, the wireless device 14 further comprises communication circuitry.

Embodiments further include a wireless device 14 comprising processing circuitry and memory. The memory contains instructions executable by the processing circuitry whereby the wireless device is configured to perform any of the steps of any of the embodiments described above for the wireless device 14.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12 configured to perform any of the steps of any of the embodiments described above for the radio network node 12.

Embodiments also include a radio network node 12 comprising processing circuitry and power supply circuitry. The processing circuitry is configured to perform any of the steps of any of the embodiments described above for the radio network node 12. The power supply circuitry is configured to supply power to the radio network node 12.

Embodiments further include a radio network node 12 comprising processing circuitry. The processing circuitry is configured to perform any of the steps of any of the embodiments described above for the radio network node 12. In some embodiments, the radio network node 12 further comprises communication circuitry.

Embodiments further include a radio network node 12 comprising processing circuitry and memory. The memory contains instructions executable by the processing circuitry whereby the radio network node 12 is configured to perform any of the steps of any of the embodiments described above for the radio network node 12.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
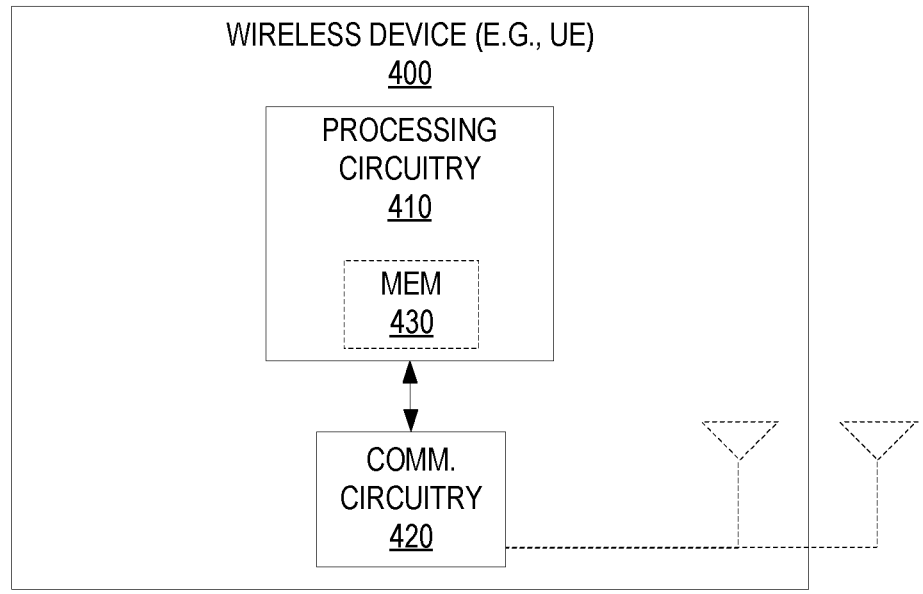
FIG. 4 is a block diagram of a wireless device according to some embodiments.

FIG. 4 for example illustrates a wireless device 400 (e.g., wireless device 14) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, e.g., in FIG. 1 and/or 2, such as by executing instructions stored in memory 430. The processing circuitry 410 in this regard may implement certain functional means, units, or modules.

Figure 5:
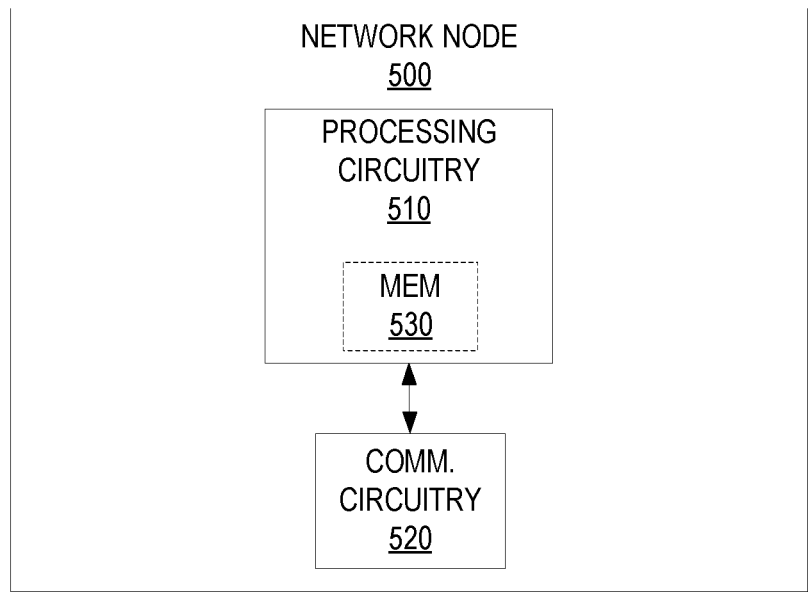
FIG. 5 is a block diagram of a radio network node according to some embodiments.

FIG. 5 illustrates a network node 500 (e.g., radio network node 12) as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 1 and/or 3, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In some embodiments below, a UE represents an example of wireless device 14, a gNB represents an example of radio network node 12, a 5G network is an example of wireless communication network 10, and a New Radio (NR) network is an example of RAN 10B.

In New Radio (NR), also referred to as "5G", a slot may be defined to be 14 symbols and a subframe may be 1 millisecond (ms). The length of a subframe may hence be as in Long Term Evolution (LTE); however, depending on numerology the number of slots per subframe can vary in NR. On carrier frequencies below 6 GHz, the numerologies 15 kHz and 30 kHz Sub-Carrier Spacing (SCS) can be supported while 60 kHz SCS may be optional for a wireless device (WD), such as a user equipment (UE). The 15 kHz SCS may be equal to the LTE numerology for normal cyclic prefix.

Downlink control information (DCI) is transmitted over a Physical Downlink Control Channel (PDCCH) and is blindly searched for by the WD. The search performed by the WD may involve one or more decoding attempts that are performed based on a hypothetical PDCCH located in pre-defined time-frequency locations, called search space entry. The set of time-frequency locations where a PDCCH may be received may be called a search space. In NR, the region of frequency resources within a slot wherein the search space is defined can be called Control Region Set (CORESET) and can be configured very flexibly. A WD can have several CORESETs configured. The search space for a CORESET may further include multiple time-locations where PDCCH is monitored.

NR may further support two types of transmissions, Type A and Type B. Type A transmissions may be slot-based, where a slot is defined as 14 OFDM symbols, while Type B is non-slot-based. The purpose of Type B may be to enable making short transmissions that can start and end more flexibly than Type A. Mini-slot transmissions can be dynamically scheduled in 3GPP Release 15 (Rel-15). For example, mini-slots may: (i) be of length 7, 4, or 2 symbols in downlink (DL) and uplink (UL); and (ii) start and end within any symbol within a slot.

Although NR can support flexible starts and ends of mini-slot transmissions it may be convenient from a scheduling perspective to define transmission time intervals (TTIs) and keep transmissions within a TTI. For the DL, i.e., network node to wireless device, it may be convenient to define PDCCH monitoring occasions at regular time instances and to keep DL transmissions between two consecutive monitoring occasions.

Type B transmissions may reduce latency for Ultra-Reliable Low-Latency Communication (URLLC). The transmissions can be scheduled and start sooner than for slot-based transmissions where scheduling and transmissions wait until the next slot.

The mapping type A or B for Physical Downlink Shared Channel (PDSCH) transmission can be dynamically signaled as part of DCI, while for the Physical Uplink Shared Channel (PUSCH) the mapping type is semi-statically configured.

NR supports dynamic scheduling with a dynamic grant. For each transmission interval, for example, a slot, the scheduler uses control signaling (e.g., in the form of DCI) to instruct the WD to transmit or receive. The control signaling may be referred to as a dynamic grant, e.g., sent as DCI on the PDCCH. It is flexible and can adapt to rapid variations in the traffic or channel behavior. However, the dynamic grant contributes to control signaling overhead.

NR therefore also supports transmission schemes that do not rely on dynamic grants. In the uplink in particular, NR supports two schemes for transmission without a dynamic grant, differing in the way they are activated. The two schemes are reflected as two types of so-called configured grants, Type 1 and Type 2. For Type 1, the WD may be radio resource control (RRC) configured with a grant that indicates the required transmission parameters; while for Type 2 the configured grant may be partly RRC configured and partly layer 1 (L1) or physical layer signaled (e.g., DCI signaling). For a Type 2 configured grant, the resource allocation may follow an UL, i.e., from the wireless device to the network node, grant received on the DCI and the resource then recurs periodically, where the period is configured by RRC. The UL grant may have a time domain resource assignment field that provides a row index of a higher layer configured table e.g., pusch-symbolAllocation, where the indexed row defines the slot offset K2, the start and length indicator SLIV, and the physical uplink shared channel (PUSCH) mapping type to be applied in the PUSCH transmission. The WD may transmit a Medium Access Control-Control Element (MAC-CE) confirm message when the configured grant is activated or deactivated.

A configured grant can use one or more Hybrid Automatic Repeat reQuest (HARQ) processes. In the configuration of the configured grant, the number of HARQ processes may be specified as well as a configuredGrantTime, which can take values of one or more periods P. The HARQ process ID may be determined by for example 3GPP Technical Specification (TS) 38.321, v15.2.0, Section 5.4.1, as follows:

For configured uplink grants, the HARQ Process ID associated with the first symbol of a UL transmission is derived from the following equation:

HARQ Process ID=[floor(CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in 3GPP TS 38.211 v15.0.0.

To improve reliability in uplink transmissions, HARQ-based retransmission may be a useful solution, if latency requirements allow for retransmission.

In NR Rel-15 (with implicit HARQ ACK/NACK), it may be specified in the MAC spec that the WD starts a timer when a MAC protocol data unit (PDU) is sent on the configured grant and flushes the buffer for new data when that timer expires. In other words, the WD may assume an implicit HARQ ACK after the timer expires. A dynamic grant for retransmission can be sent before the timer expires. This retransmission grant may effectively serve as an HARQ NACK.

There is an RRC Con figuredGrantConfig information element defined in 3GPP TS 38.331, version 15.3.0 which includes e.g. the fields cg-DMRS-Configuration, configuredGrantTimer, periodicity etc.

There currently exist certain challenges. Even though transmission occasions occur periodically for a WD with a configured uplink grant, it does not make sense for the WD (e.g., at the medium access control, MAC, layer) to send a packet if the WD's buffer is empty. Thus, a skip uplink transmission mechanism may be used such that the WD skips one or more of the transmission occasions that occur from the configured uplink grant, with the intention to save energy and reduce interference.

However, these and other scenarios may introduce a problem with implicit HARQ acknowledgements, e.g., which could in turn jeopardize very demanding URLLC requirements. The problem is that WD may not be able to determine which of at least two cases is occurring, e.g., whether a lack of HARQ feedback from the network node indicates an implicit HARQ for a transmission that the network node successfully received, or whether the lack of HARQ feedback means the network node is unaware that the WD even sent an UL transmission.

In an example NR context, these two cases may be described more particularly as:

Case 1. MAC protocol data unit (PDU) is received at the gNB and gNB correctly decodes the transport carrying the MAC PDU. In Rel-15 NR, gNB does not send any HARQ-ACK feedback. In Rel-15, the only possible feedback to send from gNB is re-transmission DL grant if the transport block is not decoded correctly.

Case 2. MAC PDU is not received correctly by gNB, where even energy is not detected at gNB. In this case, gNB is not aware that UE attempted an uplink transmission on that configured UL grant, and does not respond with re-transmission DL grant.

If an explicit HARQ feedback (more precisely, HARQ ACK) were to be introduced for addressing this problem, then it would increase resource usage of DL DCI. For a target BLock Error Rate (BLER) of $10^{-5}$-$10^{-6}$, as is the case for instance for URLLC, most transmissions are successful and introducing explicit HARQ ACK would mean high signaling load. For example, for BLER=$10^{-6}$, after 1000,000 transport block transmissions, on average gNB should send 999,999 HARQ-ACK but only one NACK.

Alternatively or in addition to transmitting HARQ-ACK, which is for Case 1, some embodiments herein focus on Case 2, in order to improve the mis-detection probability.

Some embodiments exploit downlink control signaling, which may be called for convenience energy_not_detected_indicator. This signaling will be transmitted to UE for a configured grant transmission. The energy_not_detected_indicator in some embodiments is one bit of information which comes out of the energy-detection process over the assigned resources for an uplink's configured grant transmission. In one example, the signaling is sent to the WD through the next available DCI. In another example, the signaling is sent where a separate/common physical downlink shared channel (PDSCH) resource can be allocated for the signaling transmission. In some embodiments, the techniques herein allow the energy_detection_indicator to be sent occasionally, only when the detected energy is less than a pre-defined threshold. This occasional transmission can reduce the load of the added signaling as compared to existing techniques. Accordingly, some embodiments herein may improve the reliability of uplink configured grant transmissions.

In an uplink grant-free transmission, gNB receives data over PUSCH channel according to the RRC configuration. In some embodiments, gNB performs the energy detection process beside its normal activities in decoding data in PUSCH over the assigned time-frequency resources for a UE's configured grants. This is also shown in FIG. 6. The energy detector block 54 in the gNB 52 examines whether the energy level over the assigned resources is smaller than a pre-defined value, i.e., threshold. If so, the gNB 52 may assume Case 2, and sends an energy level feedback to the UE 50 about that. Otherwise, the gNB 52 does not send back the energy feedback signal. Further, a timer is defined for the energy level feedback. The energy level feedback must be sent before the timer expires. If no energy level feedback is sent to UE 50 before the timer expires, UE 50 may assume Case 1, i.e., implicit ACK, and the UE flushes its buffer for the corresponding transport block.

Next, the UE 50 receives the feedback 56 from the gNB 52 if the detected energy is lower than the threshold. This is shown in FIG. 7.

Figure 8:
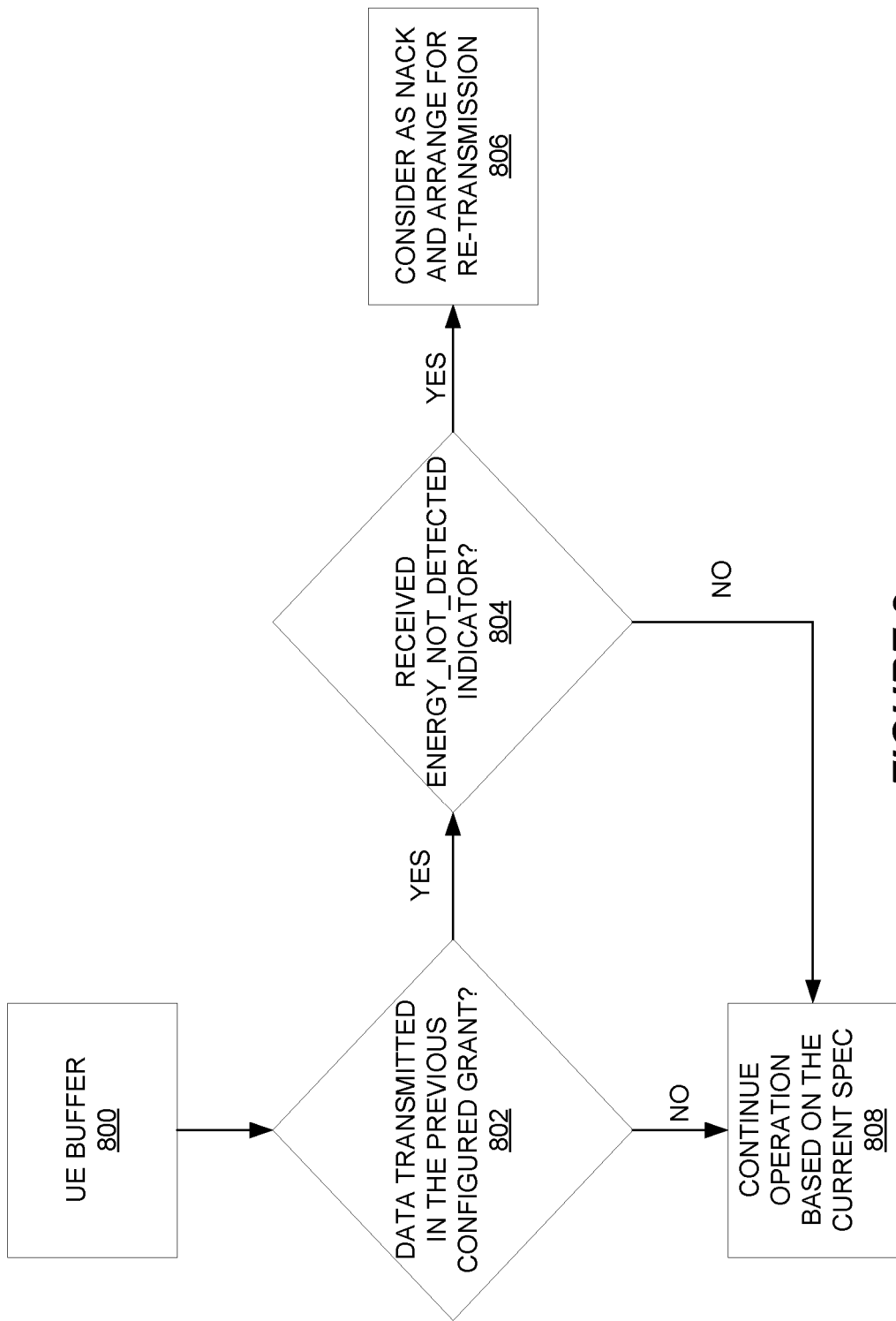
FIG. 8 is a logic flow diagram of a method performed by a UE according to some embodiments.

Since UE 50 knows that in the previous transmission occasion it sent data or not, it can interpret the received energy_not_detected_indicator 56 as HARQ NACK or normal incident based on the flowchart in FIG. 8. In particular, the flowchart of FIG. 8 shows that the UE in step 802 checks, based on the UE buffer 800, whether data was transmitted in the previous configured grant (Step 802). If so (YES at step 802), the UE checks whether it received an energy_not_detected_indicator 56 (Step 804). If so (YES at Step 804), the UE considers reception of the energy_not_detected_indicator 56 as a NACK and arranges for re-transmission of the data (Step 806). If the UE did not receive an energy_not_detected_indicator 56, though (NO at Step 804), the UE continues operation based on the current telecommunication standard specifications (Step 808). If no data was transmitted in the previous configured grant (NO at Step 802), the UE continues operation based on the current telecommunication standard specifications (Step 808). In particular, as described above, the UE in this case considers reception of an uplink grant for a re-transmission as a NACK and arranges for re-transmission of the data. Or, the UE interprets the lack of an uplink grant (coupled with the lack of an energy_not_detected_indicator 56 in Step 804) as an ACK. The UE in this latter case, then, arranges for transmission of new data.

In one example, the signaling is sent to UE through the next available DCI. In another example, the signaling is sent where a separate/common PDSCH resource can be allocated for the signaling transmission. Notably, though, energy_not_detected_indicator 56 is sent occasionally, only when the detected energy is less than a pre-defined threshold. This occasional transmission reduces the load of the added signaling.

Even with this approach, it is still of importance that the energy is securely detected. One approach may be to look at the power of the DMRS, but it is important to increase the robustness of this energy detection.

Certain aspects of the present disclosure and their embodiments may provide solutions to these or other challenges. Some embodiments, for example, configure a UE 50 to transmit a denser DMRS in the uplink, e.g., as needed to increase uplink transmission detection probability. Other embodiments exploit other types of signals and/or other configurations of signals, alternatively or in addition to different configurations (e.g., densities) of DMRS, in order to adapt uplink transmission presence detection probability.

Certain embodiments may provide one or more of the following technical advantage(s): (i) improve the reliability of uplink configured grant transmission; and/or (ii) make the adaption faster if using DCI.

No matter the particular type of configurations or signals used, the configuration can be done on a per-need basis over RRC configuration. This approach will take some time due to the RRC configuration, and that the gNb needs to detect the need for such an increase. In any event, gNB in some embodiments detects a need for increased DMRS (e.g., to improve energy detection probability), and then configures denser DMRS. The gNb could base the decision on, for example, SNR/channel measurements, measurements on SRS (sounding reference signals), reported channel state information, or the like.

In other embodiments, after having sent UL data, but noting that the gNB didn't receive it or even detect the presence, the UE sends an uplink message to gNb, e.g., on PUCCH. This will then signal to the gNb that the gNB failed to detect a transmission. The gNB can in DCI then tell the UE to transmit signals that are easier to energy detect (e.g., denser DMRS, a dedicated transmission indicator, or the like). This will lead to a faster reliability increase, compared to RRC configuration.

Some embodiments described below exploit some or all of the below types of signals.

Signal 1: [gNB→UE: energy_not_detected_indicator]: This is the indicator 56 described above. Here, the received energy on DMRS or other signal is compared to a certain threshold, which can be adaptive based on channel, noise and interference measurements, or reliability or power saving requirements.

Signal 2: [UE→gNb: ask-for-dense-DMRS]: After having sent UL data, but noting that the gNB didn't receive it or even detect the presence, a UL message is sent from UE to gNb, e.g., on PUCCH. This UL message (ask-for-dense-DMRS) may be one realization of control signaling 22 in FIG. 1. Regardless, this will then at least implicitly signal to the gNb that the gNB failed to detect a transmission. This signal can also be generated when the UE in advance for some other reason determines that denser DMRS is beneficial (e.g. by SINR measurements, channel reports, channel measurements, etc).

Signal 3: [gNb→UE: configure-dense-DMRS]: The gNB can in DCI tell the UE to transmit signals that are easier to energy detect (e.g., denser DMRS, dedicated transmission indicator, or the like). This DCI may be one realization of downlink control signaling 24 in FIG. 1. Regardless, this will lead to a faster reliability increase, compared to RRC configuration. As explained below, this signal can both be triggered by measurements, or by receiving requests from the UE.

Not all three signals necessarily need to be used. Different combinations of which of the three signals may be used are described below. Below follow descriptions of six example scenarios.

Figure 9:
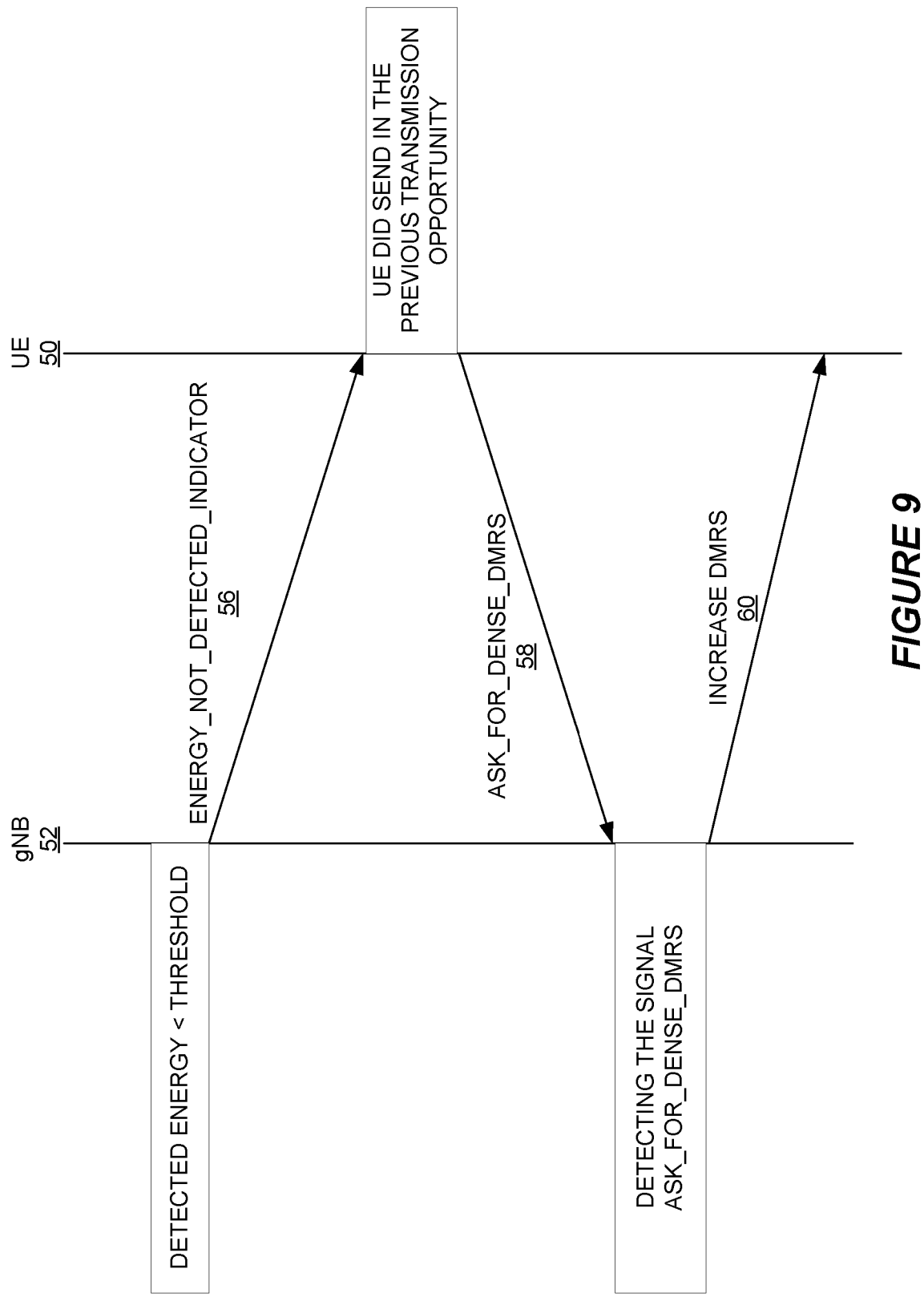
FIG. 9 is a signaling diagram for signaling between a UE and gNB according to some embodiments.

A first scenario uses all three signals, including Signals 1, 2, and 3. FIG. 9 shows the signaling transmission between gNB 52 and UE 50 for this case. In this case, the gNb 52 sends "energy_not_detected_indicator" 56 after having received energy below a certain threshold. When UE 50 receives this signal 56 and indeed did previously transmit, it sends "ask-for-dense-DMRS" 58. Upon receiving the request for dense DMRS, the gNb 52 configures UE for dense DMRS using configure-dense-DMRS 60.

For the remaining cases, the figures will be similar, but with less than all three signals between gNb and UE.

A second scenario uses Signals 1 and 3, but not Signal 2. In this case, the gNb 52 sends "energy_not_detected_indicator" 56, and then also configures the UE 50 for dense DMRS 60, without waiting for the UE asking for dense DMRS 58.

A third scenario uses Signals 1 and 2, but not Signal 3. In this case, the gNb 52 sends "energy_not_detected_indicator" 56. When UE 50 receives this signal and did previously transmit, it sends "ask-for-dense-DMRS" 58. In this embodiment, the UE 50 after sending this signal starts to use dense DMRS. In some embodiments, for instance, the decision of dense DMRS is taken by UE 50, and the eNb 52 is informed through "ask-for-dense-DMRS" 58. In this case, ask-for-dense-DMRS 58 may more appropriately be referred to as notify-dense-DMRS since the signal serves more of a notification that the UE will use denser DMRS than a request for permission to use denser DMRS.

A fourth scenario uses Signals 2 and 3, but not Signal 1. In one embodiment, the UE 50 determines that the DMRS should be denser, e.g., without relying on Signal 1 for such purpose. The UE 50 sends "ask-for-dense-DMRS" 58 upon making this determination. Upon receiving a request for dense DMRS, the gNb 52 configures the UE 50, using DCI or regular RRC, for dense DMRS.

A fifth scenario uses Signal 3, but not Signal 1 and not Signal 2. In one embodiment, the gNb 52 decides that the UE 50 should send denser DMRS. It then configures the UE 50 for dense DMRS, over DCI message or RRC.

A sixth scenario uses Signal 2, but not Signal 1 and not Signal 3. In one embodiment, the UE 50 determines that the DMRS should be denser. It sends "ask-for-dense-DMRS" 58, and after that starts to use dense DMRS. Upon receiving "ask-for-dense-DMRS" 58, the gNb 52 knows that the UE 50 will transmit dense DMRS. In some embodiments, the "ask-for-dense-DMRS" 58 may more appropriately be referred to as notify-dense-DMRS since the signal serves more of a notification that the UE will use denser DMRS than a request for permission to use denser DMRS.

In one embodiment, the energy detection can be based on baseband signals and using DMRS sequence detection. That is, gNB 52 performs DMRS sequence detection assuming the UE 50 has transmitted PUSCH and associated DMRS according to its UL configured grant configuration. The more reliable energy detection is achieved by a denser DMRS density. Then the DMRS can both be used for detecting energy as well as improving channel estimation. The UE 50 could as an alternative be configured to transmit another set of reference signals, such as PT-RS, which then is used to detect energy on, but not used for demodulation. In still other embodiments, energy detection may be performed using radio frequency signals.

In another embodiment, the more reliable energy detection is achieved by constructing a dedicated easy-to-detect signal on reserved resources. This can e.g. be a special defined sequence that can be securely detected, with the only usage being this transmit detection.

Since for the PUSCH the mapping type is semi-statically configured, it can be out-dated and some embodiment suggests to dynamically change the mapping type by DCI.

Although some embodiments above were exemplified using DMRS density as the mechanism to adapt uplink transmission presence detection probability, other embodiments herein employ other mechanisms in addition or in the alternative. As suggested above, for instance, other mechanisms may include using, and/or adapting the configuration of, other types of signals, including for instance a phase tracking reference signal and/or a dedicated signal for energy detection.

With this in mind, some embodiments herein include a method performed by a radio network node (e.g., a gNb 52) that includes: (i) operating UE communication with certain DMRS density; (ii) (optional) determining that detection probability of transmitted UE signal should be increased; (iii) configuring the UE 50 with a more dense UL DMRS; and (iv) (optional) performing energy detection on new DMRS density.

In some embodiments, this determination is based on measured DMRS power being low.

Embodiments herein also include a method performed by a wireless device (e.g., UE 50). The method may include: (i) sending an UL transmission; (ii) deciding that the reliability of an uplink transmission presence indicator (e.g., as an example of signaling 22) should be changed; and (iii) Informing a radio network node (e.g., on control channel) that such reliability of the uplink transmission presence indicator should be changed. In some embodiments, this may amount to requesting that the radio network node change a configuration of the uplink transmission presence indicator.

In one or more embodiments, the method may also include receiving configuration for transmission of more a reliable indicator. Alternatively or additionally, the method may include transmitting such a more reliable indicator.

In one or more embodiments, this more reliable indicator is specially-designed indicator, that makes robust the detection of UL transmission existence. Alternatively, the more reliable indicator may be realized by increased DMRS density. In some embodiments, then, the method may include transmitting a message to increase DMRS density.

In some embodiments, the decision to increase the reliability of the uplink transmission presence indicator is made by the UE itself. Alternatively or additionally, the decision may be made based on the indication from gNb that energy was not detected.

Embodiments herein further include a method performed by a radio network node (e.g., gNB 52). The method may include (i) (optionally) sending information to the UE that energy was not detected; (ii) (optional) receiving information from the UE that the UE wants to send more reliability uplink transmission detection signal; (iii) (optional) sending a configuration to UE indicating that the UE is to transmit a more reliable detection signal; and (iv) performing energy detection on the more reliable detection signal. In some embodiments, the more reliable indicator is a specially-designed indicator, which makes robust the detection of UL transmission existence. In other embodiments, the more reliable indicator is a DMRS with increased DMRS density.

Figure 10:
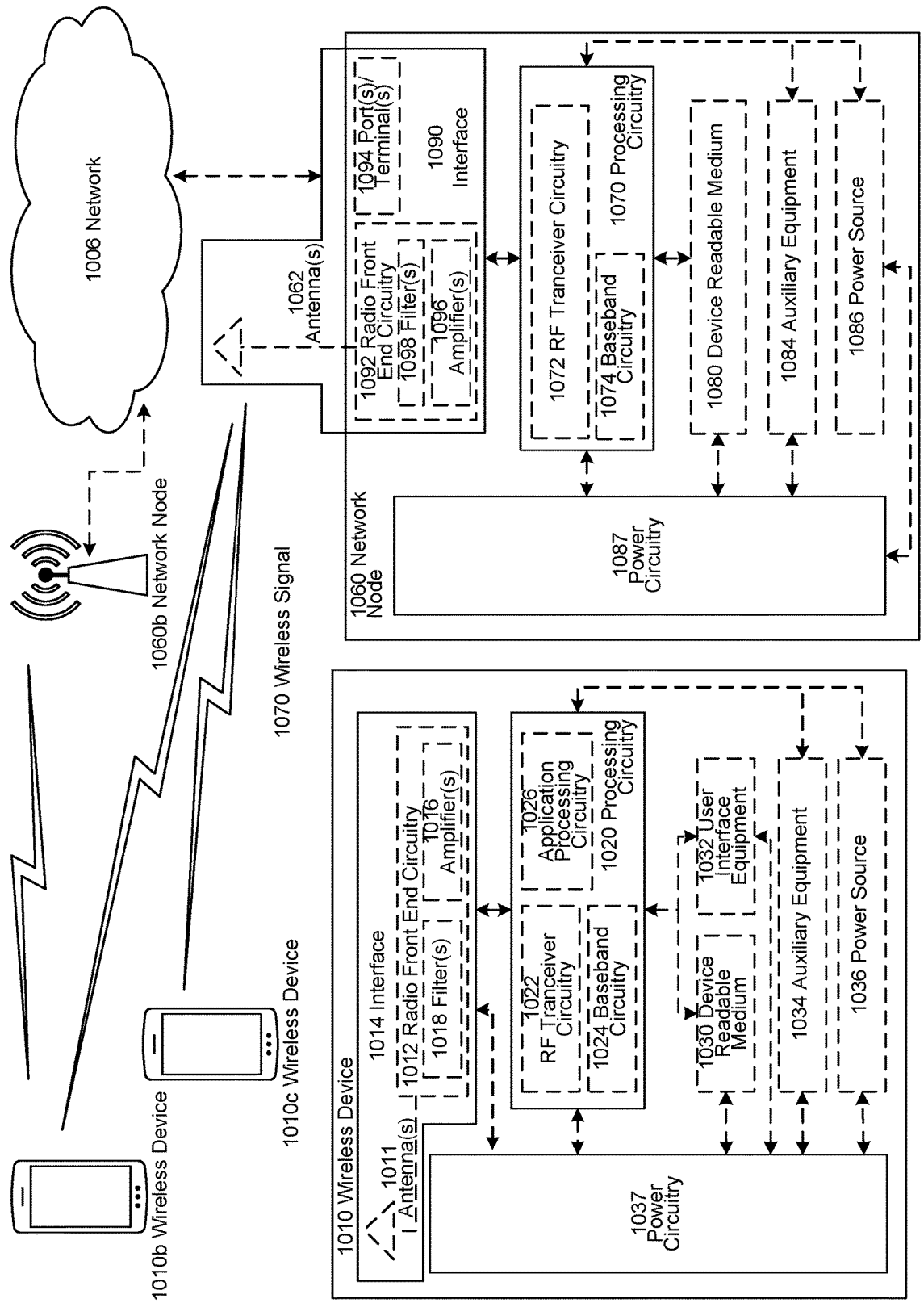
FIG. 10 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 10. The wireless network may for instance be an example of wireless communication network 10 in FIG. 1. For simplicity, the wireless network of FIG. 10 only depicts network 1006, network nodes 1060 and 1060b, and WDs 1010, 1010b, and 1010c. Any of network nodes 1060 and 1060b may be an example of radio network node 12 in FIG. 1. Any of WDs 1010, 1010b, and 1010c may be an example of wireless device 14 in FIG. 1. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. A radio network node is a network node in a radio access network (RAN) of a wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
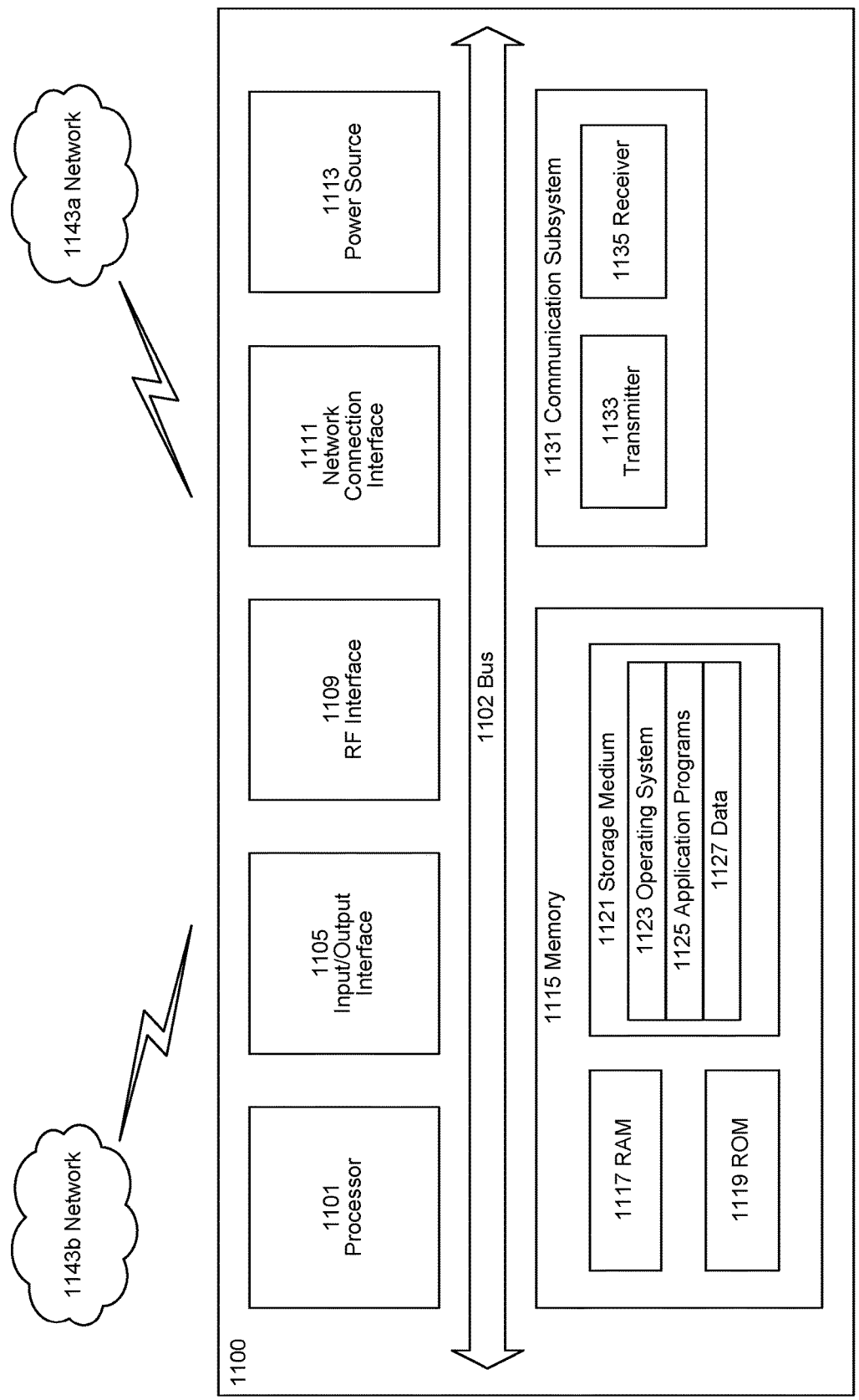
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
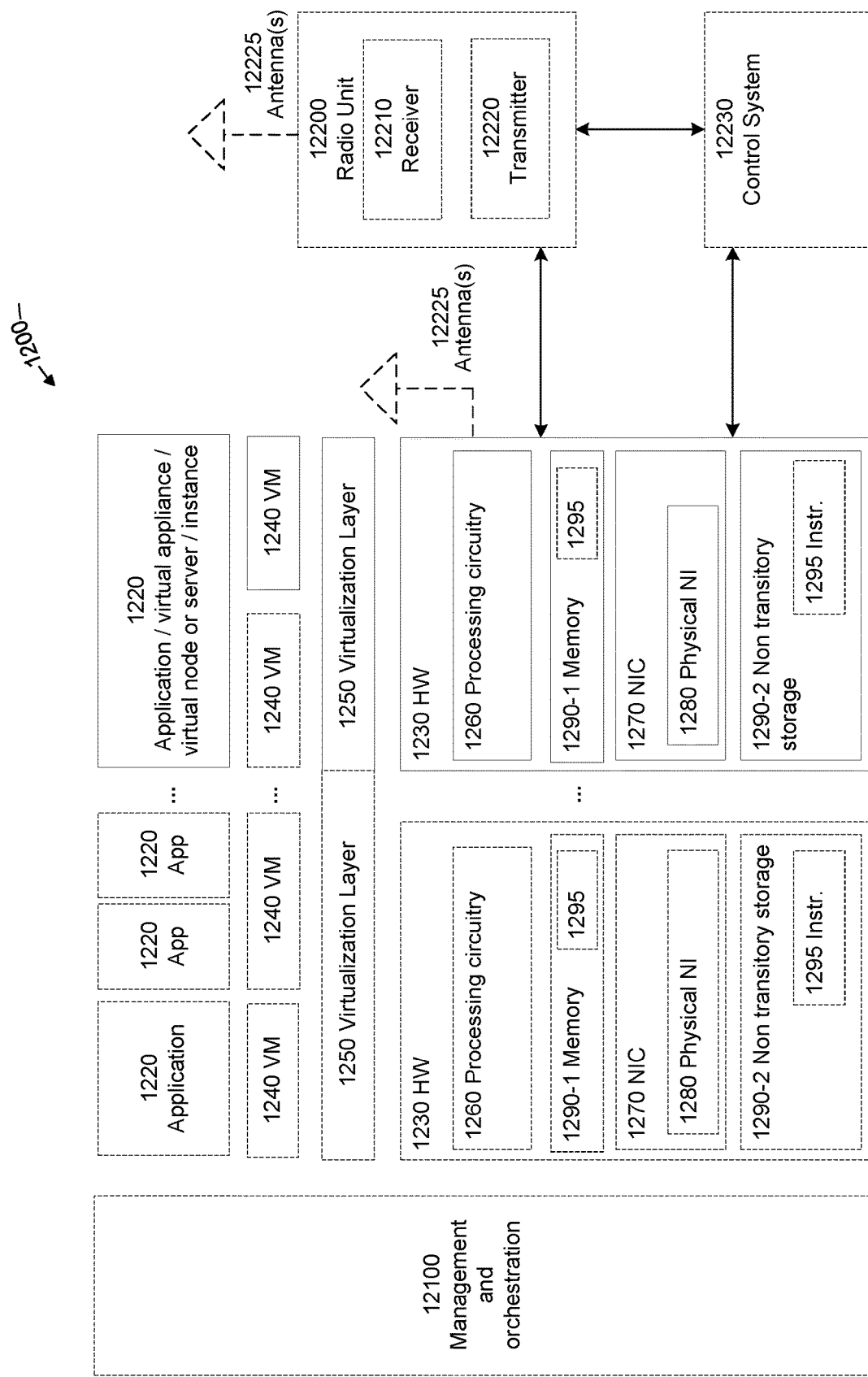
FIG. 12 is a block diagram of a virtualization environment according to some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be effected with the use of control system 12230 which may alternatively be used for communication between the hardware nodes 1230 and radio units 12200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method performed by a wireless device, the method comprising:
    transmitting an uplink transmission to a radio network node;
    transmitting uplink transmission presence signaling that indicates, or is usable to detect, the presence of the uplink transmission within a transmission occasion according to a configured uplink grant, wherein the uplink transmission presence signaling comprises a demodulation reference signal; and
    transmitting, to the radio network node, control signaling that indicates or requests a change in a configuration with which the wireless device is to transmit the uplink transmission presence signaling in or in association with the next transmission occasion corresponding to the configured uplink grant; and
    wherein the control signaling indicates or requests a change in a density in time and/or frequency of the uplink transmission presence signaling and/or a change in a power of the uplink transmission presence signaling.

2. The method of claim 1, further comprising monitoring for feedback from the radio network node indicating that no uplink transmission presence signaling was detected, and determining whether or not to re-transmit the uplink transmission based at least in part on said monitoring.

3. The method of claim 1, wherein possible configurations with which the uplink transmission presence signaling is transmittable include two or more different configurations of the demodulation reference signal.

4. The method of claim 3, wherein the two or more different configurations of the demodulation reference signal configure the demodulation reference signal to be transmitted with different densities in time and/or frequency.

5. The method of claim 1, wherein the control signaling explicitly indicates that the radio network node failed to detect the uplink transmission presence signaling that the wireless device transmitted to the radio network node, and implicitly indicates or implicitly requests the change in the configuration with which the wireless device transmits the uplink transmission presence signaling.

6. The method of claim 1, further comprising, after transmitting the control signaling, receiving, from the radio network node, downlink control signaling that indicates:
    whether or not the radio network node acknowledges or approves of the wireless device transmitting the uplink transmission presence signaling with the configuration indicated or requested by the control signaling; or
    the same or a different configuration, from among multiple possible configurations, with which the wireless device is to transmit the uplink transmission presence signaling.

7. The method of claim 1, wherein the control signaling indicates or requests a change in the density in time and/or frequency of the uplink transmission presence signaling.

8. The method of claim 1, wherein the control signaling indicates or requests a change in the power of the uplink transmission presence signaling.

9. A method performed by a radio network node, the method comprising:
    monitoring for uplink transmission presence signaling that indicates, or is usable to detect, the presence of an uplink transmission from the wireless device within a transmission occasion according to a configured uplink grant, wherein the uplink transmission presence signaling comprises a demodulation reference signal; and
    receiving, from a wireless device, control signaling that indicates or requests a change in a configuration with which the wireless device is to transmit the uplink transmission presence signaling in or in association with the next transmission occasion corresponding to the configured uplink grant; and wherein the control signaling indicates or requests a change in a density in time and/or frequency of the uplink transmission presence signaling and/or a change in a power of the uplink transmission presence signaling.

10. The method of claim 9, further comprising, responsive to receiving the control signaling, transmitting, to the wireless device, downlink control signaling that indicates:
whether or not the radio network node acknowledges or approves of the wireless device transmitting the uplink transmission presence signaling with the configuration indicated or requested by the control signaling; or
the same or a different configuration, from among multiple possible configurations, with which the wireless device is to transmit the uplink transmission presence signaling.

11. The method of claim 10, wherein said monitoring comprises monitoring for the uplink transmission presence signaling with the configuration indicated by the downlink control signaling.

12. The method of claim 9, further comprising transmitting feedback from the radio network node to the wireless device indicating that no uplink transmission presence signaling was detected according to said monitoring.

13. The method of claim 9, wherein the uplink transmission presence signaling indicates, or is usable to detect, the presence of the uplink transmission within a resource allocation allocated to the wireless device and/or within a transmission occasion according to a configured uplink grant.

14. The method of claim 9, wherein the control signaling explicitly indicates that the radio network node failed to detect the uplink transmission presence signaling that the wireless device transmitted to the radio network node, and implicitly indicates or implicitly requests the change in the configuration with which the wireless device transmits the uplink transmission presence signaling.

15. A wireless device comprising:
communication circuitry; and
processing circuitry configured to:
transmit an uplink transmission to a radio network node;
transmit uplink transmission presence signaling that indicates, or is usable to detect, the presence of the uplink transmission within a transmission occasion according to a configured uplink grant, wherein the uplink transmission presence signaling comprises a demodulation reference signal; and
transmit, to the radio network node, control signaling that indicates or requests a change in a configuration with which the wireless device is to transmit the uplink transmission presence signaling in or in association with the next transmission occasion corresponding to the configured uplink grant; and
wherein the control signaling indicates or requests a change in a density in time and/or frequency of the uplink transmission presence signaling and/or a change in a power of the uplink transmission presence signaling.

16. The wireless device of claim 15, wherein the processing circuitry is further configured to monitor for feedback from the radio network node indicating that no uplink transmission presence signaling was detected, and determine whether or not to re-transmit the uplink transmission based at least in part on monitoring for the feedback.

17. The wireless device of claim 15, wherein the control signaling indicates or requests a change in the density in time and/or frequency of the uplink transmission presence signaling.

18. The wireless device of claim 15, wherein the control signaling indicates or requests a change in the power of the uplink transmission presence signaling.

19. A radio network node comprising:
communication circuitry; and
processing circuitry configured to:
monitor for uplink transmission presence signaling that indicates, or is usable to detect, the presence of an uplink transmission from the wireless device within a transmission occasion according to a configured uplink grant, wherein the uplink transmission presence signaling comprises a demodulation reference signal;
receive, from a wireless device, control signaling that indicates or requests a change in a configuration with which the wireless device is to transmit the uplink transmission presence signaling in or in association with the next transmission occasion corresponding to the configured uplink grant; and
wherein the control signaling indicates or requests a change in a density in time and/or frequency of the uplink transmission presence signaling and/or a change in a power of the uplink transmission presence signaling.

20. The radio network node of claim 19, wherein the processing circuitry is further configured to, responsive to receiving the control signaling, transmit, to the wireless device, downlink control signaling that indicates:
whether or not the radio network node acknowledges or approves of the wireless device transmitting the uplink transmission presence signaling with the configuration indicated or requested by the control signaling; or
the same or a different configuration, from among multiple possible configurations, with which the wireless device is to transmit the uplink transmission presence signaling.

* * * * *